United States Patent [19]

Olsen

[11] Patent Number: 5,440,538
[45] Date of Patent: Aug. 8, 1995

[54] COMMUNICATION SYSTEM WITH REDUNDANT LINKS AND DATA BIT TIME MULTIPLEXING

[75] Inventor: James J. Olsen, Concord, Mass.

[73] Assignee: Massachusetts Institute of Technology, Cambridge, Mass.

[21] Appl. No.: 126,302

[22] Filed: Sep. 23, 1993

[51] Int. Cl.[6] .......................... H04L 1/00; H04L 1/22
[52] U.S. Cl. ........................................ 370/13; 370/16; 359/110; 371/20.1
[58] Field of Search ...................... 370/13, 16; 371/8.1, 371/8.2, 11.1, 11.2; 340/825.01, 825.03, 827; 359/110

[56] References Cited

U.S. PATENT DOCUMENTS

| | | | |
|---|---|---|---|
| 3,681,694 | 8/1972 | Sarati | 371/8.2 X |
| 4,234,956 | 11/1980 | Adderley et al. | 371/8.2 X |
| 5,204,836 | 4/1993 | Reed | 371/11.2 X |
| 5,218,465 | 6/1993 | Lebby et al. | 370/16 X |
| 5,327,275 | 7/1994 | Yamane et al. | 370/16 X |

Primary Examiner—Melvin Marcelo
Attorney, Agent, or Firm—Hamilton, Brook, Smith & Reynolds

[57] ABSTRACT

A communication system and a method for communicating on a communication channel are described. A substitution switch preferably comprised of high speed multiplexer and demultiplexer integrated circuits maps failed links to redundant spare links to allow communication to continue across the channel. Where there are fewer links than there are data bits in a word to be transmitted across the channel, such as when one or more links in the channel have failed and no spare links are provided, a channel width reduction switch time multiplexes bits in a data word to allow the channel to continue operating at a rate lower than its normal full-width operating rate. To allow the channel width reduction switch to implement the time multiplexing function, a substitution switch is included in the system to map failed links to desired locations in the channel width reduction switch.

25 Claims, 28 Drawing Sheets

COMMUNICATION SYSTEM WITH REDUNDANT LINKS AND DATA BIT TIME MULTIPLEXING

BACKGROUND OF THE INVENTION

Data communication is commonly implemented on a communication channel having multiple parallel communication links. Data words having multiple bits are transmitted over the channel, with each bit being transmitted on a single link. The width of the communication channel is typically expressed in terms of the number of communication links in the channel and, therefore, the number of bits in a data word. That is, a channel which is eight links wide will carry eight-bit data words.

Communication on the channel can often be impaired by the failure of one or more of the communication links. Such failures can include excessive noise in the link or lack of continuity caused by a break in a cable. Because even a single link failure can result in a total loss of communication on the channel, communication systems typically monitor each link for failures. When a failure is discovered, the system takes a corrective action. In most systems, this involves switching the communication from the faulty channel to a redundant spare channel having a complete set of communication links. The channel having the faulty link is left unused while communications continue on the new redundant channel.

SUMMARY OF THE INVENTION

The present invention is directed to a communication system and a method for continuing communication on a communication channel after one or more of a plurality of communication links on the channel has failed. The invention is also directed to a communication system and method for transmitting data words across a channel when the data word has more bits than there are links in the channel.

The system of the invention implements communication on a communication channel by various methods depending upon the configuration of the channel and the state of the links in the channel. Where the channel has spare communication links, the invention uses a group of switches, referred to collectively as a substitution switch, to switch spare links into the channel to replace failed links. A spare link bypasses a failed link such that communications on the channel can continue.

Where spare links are not provided or where more failures occur than there are spare links, another set of switches, referred to collectively as a channel width reduction switch, provides for time multiplexing of bits over the operating links in the channel. To implement time multiplexing, it may be necessary to first reconfigure the communication channel by switching a failed communication link toward an appropriate failure position in the channel width reduction switch. In a preferred embodiment, this is implemented by including a substitution switch within the channel width reduction switch. Instead of using the substitution switch to switch a spare link into the channel, it is used to map the failed link to the desired failure position in the channel width reduction switch.

In one embodiment, the substitution switch includes an array of transmitting switches which are connected between channel input bit lines and the channel communication links such that each communication link is connectable to at least two of the input bit lines. On the receiving end of the channel, the system includes a receiving array of switches which are connected between the communication links and output bit lines. The receiving switch array is a mirror image of the transmitting switch array, with each of the receiving switches allowing for connections between each communication link and at least two output bit lines. The transmitting switches allow for remapping of interconnections between the input bit lines and the communication links, and the receiving switches allow for remapping of interconnections between the communication links and the output bit lines. This remapping allows for switching in spare links to bypass failed links and for reconfiguring the communication channel to provide for time multiplexing of signals by the channel width reduction switch.

As noted above, the channel width reduction switch can be used to implement time multiplexing of bits in a data word. Parallel bits of each data word to be transmitted across the channel arrive at input bit lines of the channel width reduction switch simultaneously. If all of the communication links are operative, all of the bits pass through the channel in parallel to the receiving side of the switch and then out to output bit lines of the switch. However, if one or more of the links has failed, the channel width reduction switch will cause data communication to take place in a time multiplexed fashion.

Data words are transmitted across the communication channel from the transmit side to the receive side in successive cycles. In time multiplexing, some of the bits of each data word are transmitted directly across the channel and are stored at the receive side while others are stored on the transmit side for transmission in a succeeding cycle. In the succeeding cycle, the bits stored during the previous cycle are forwarded across the channel to the receive side where they join the bits which were directly transmitted during the preceding cycle. The preceding word is thus completed at the receive side and is output from the switch. Simultaneously, during the succeeding cycle, some of the bits in the data word arriving at the transmit side are transmitted directly across the channel to the receive side of the switch where they are temporarily stored. The remaining bits in the succeeding word are stored on the transmit side.

When the number of bits in a word is one more than the number of links, the number of bits stored in the succeeding word on the transmit side is one more than the number stored during the previous word. Consequently, the number of bits directly transmitted across the channel is one less than the number directly transmitted in the previous cycle. During a third succeeding cycle, a third succeeding data word appears at the transmit side of the channel width reduction switch. One more bit than was stored in the immediately preceding cycle is stored on the transmit side of the switch while the remaining bits in the word are directly transmitted through where they are stored on the receive side. Those bits which were stored on the transmit side during the immediately preceding cycle are transmitted across the channel where they rejoin the bits that were directly transmitted across the channel stored during the immediately preceding cycle. The next complete word so formed is then output from the receive side of the switch.

This process continues until the storage capacity on the transmit side of the switch is exhausted. At this point, processing of data words at the transmit side is held up for one cycle while all of the bits stored at the transmit side are forwarded across the channel to the receive side. The last complete data word is formed and is output from the receive side of the switch. Transmission of data words can then resume with another first cycle beginning as one bit of the first data word is stored on the transmit side and the remaining bits are transmitted directly across to the receive side.

In one embodiment of the channel width reduction switch, the storage of bits is effected by registers at both the transmit and receive sides of the switch. The stored bits of a word are held in the registers on the transmit side and the directly transmitted bits are held in registers on the receive side.

In a preferred embodiment of the invention, the individual switches in the substitution switch and the channel width reduction switch are implemented by demultiplexer and/or multiplexer circuits. Control lines to the demux and mux circuits implement the switching of the communication links to the appropriate input and output lines.

The present invention uses high speed integrated circuits such as registers, demultiplexers and multiplexers to allow the communication system to continue operating when one or more links on the communication channel fail. Rather than running entire redundant communication channels as in prior systems, the present invention employs inexpensive and reliable integrated circuit technology at the small expense of reduced data transmission speed in the event of partial channel failure.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
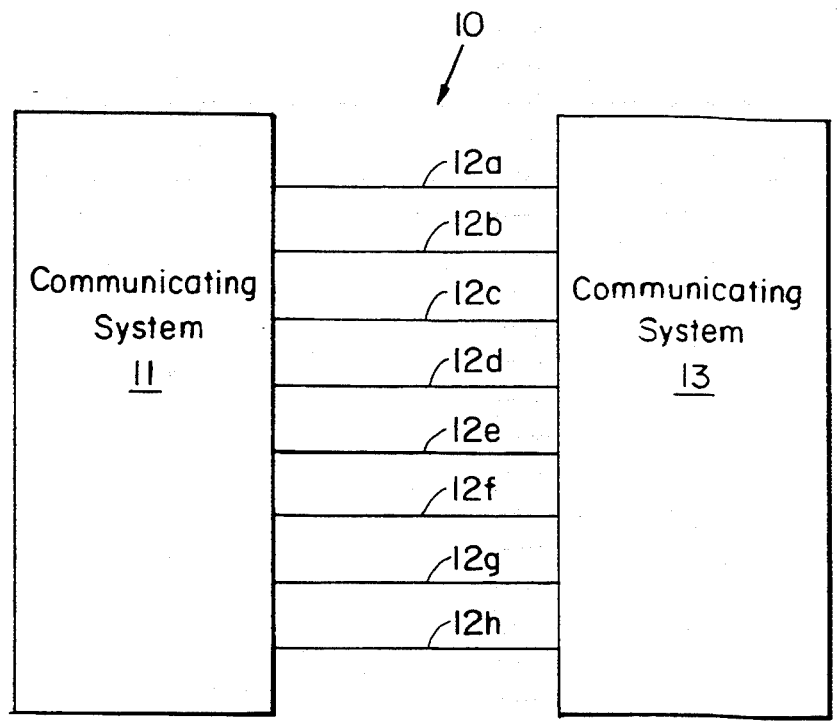
FIG. 1 is a block diagram of two systems communicating across a communication channel.

FIG. 1 is a block diagram of two systems 11 and 13 which communicate over an eight-bit communication channel 10 which is comprised of eight communication links 12a–12h. Throughout this application, an eight-link channel is described to illustrate the invention. It will be understood that the invention described herein is applicable to communication channels having any number links and carrying any number of bits. In a preferred embodiment, the channel 10 is an optical channel, and the links are optical links. However, it will be understood that the invention is applicable to other types of communication channels such as electrical channels. For purposes of the present invention, each communication link 12a–12h carries a single parallel data bit of each data word transmitted across the channel 10. Each of the bits is transmitted from one system 11 to the other 13 simultaneously in parallel across the channel 10. In the system shown in the figure, the channel is eight links or eight-bits wide. Therefore, the channel will handle eight-bit data words.

Should one of the links 12a–12h in the system of FIG. 1 fail, communication via eight-bit data words would become impossible since one bit from each word would be missing. Prior systems have solved this problem by connecting complete redundant eight-bit channels between the systems 11, 13. In such systems, when one link fails, the entire channel is deemed to have failed, and communications are switched to the second redundant communication channel. This leaves the seven good links in the failed channel unused and wasted. In contrast, as described in detail below, the present invention provides for continuing communication across the single communication channel 10 without the use of complete redundant channels.

Figure 2:
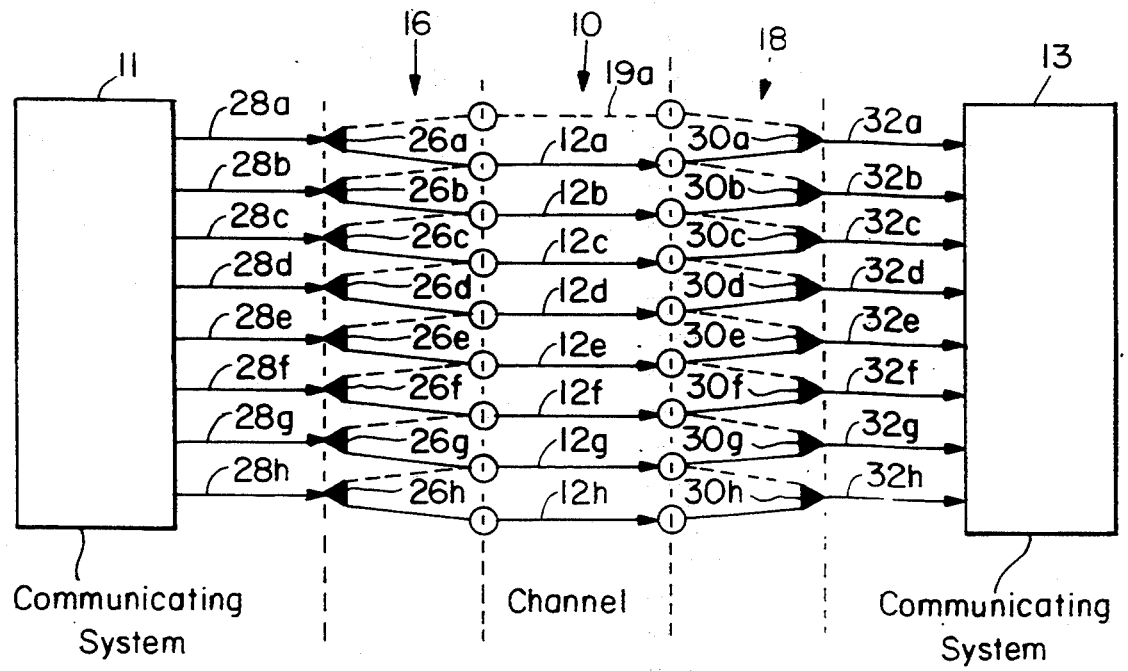
FIG. 2 is a schematic diagram showing a one-stage substitution switch in accordance with the present invention connected to a communication channel.

One approach to the problem of failed links used by the present invention is including redundant spare links within the channel 10. The system has the ability to switch communication from a failed link to a spare link such that the width of the channel is not reduced by the link failure. FIG. 2 schematically depicts a single-stage substitution switch in accordance with the present invention used to implement the redundant sparing approach of the invention.

The substitution switch includes a transmit side or transmit switch 16 and a receive side or receive switch 18 connected on opposite sides of the communication channel 10. The eight-bit channel 10 includes eight links 12a–12h as well as a single redundant spare link 19a. The transmit side 16 of the substitution switch is connected between input bit lines 28a–28h from system 11 and the channel 10 and includes one demultiplexer circuit 26a–26h for each input bit line 28a–28h. The receive side 18 of the switch is connected between the channel 10 and output bit lines 32a–32h and includes eight multiplexer circuits 30a–30h, each of which is connected to an output bit line 32a–32h. The eight output bit lines 32 are connected to system 13.

Each demultiplexer 26a–26h on the transmit side 16 is paired with a mirror image multiplexer 30a–30h on the receive side 18. The demultiplexers 26a–26h and multiplexers 30a–30h each can assume one of two possible states, an "up" state or a "down" state. Since they are always mirror images of each other, whatever state a demultiplexer 26a–26h assumes, its corresponding multiplexer 30a–30h assumes the same state. A demultiplexer/multiplexer pair will be referred to herein as a "switch point." Each switch point can be thought of as having two ports, a lower port and an upper port. Depending upon the selected state of its constituent demultiplexer 26 and multiplexer 30, a switch point can be said to be in an "up" state if its upper port is active and in a "down" state if its lower port is active.

In FIG. 2, a solid line indicates an active connection while a dotted line indicates an inactive connection. Therefore, all of the switch points in the figure are shown in their down states with their lower ports active. As a result, all of the input bit lines 28a–28h are connected to corresponding output bit lines 32a–32h via links 12a–12h, respectively, on the channel 10. Because the upper port of the top switch point is inactive, the spare link 19a is shown inactive.

Figure 3:
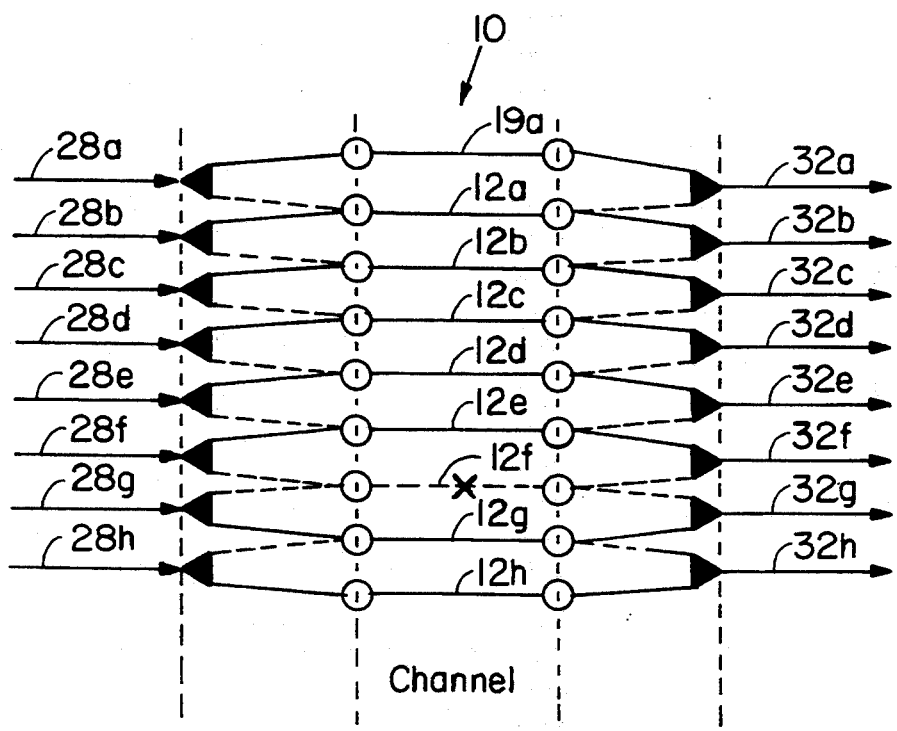
FIG. 3 is a schematic diagram showing the substitution switch of FIG. 2 after a single channel link failure.

FIG. 3 shows how the substitution switch of FIG. 2 recovers from the failure of one of the links in the channel 10. In particular, the figure shows recovery from the failure of link 12f. It can be seen in the figure that the switch points below the failure are in the down state and the switch points above the failure are in the up state. The process followed for recovering from the failure is as follows. Under normal operation where no failure has occurred, all of the switch points are in the down position. Thus, without a failure, the spare link 19a is not used since it is at the top of the switch. When a failure occurs, the recovery process begins at the bottom switch point and proceeds up the switch. Each switch point is left in the down state until the failed link is reached. The states of the switch points above the failure are inverted. Thus, as shown in FIG. 3, the switch points below the failed link are in the down state, and the switch points above the failed link are in the up state. All of the input bit lines 28a–28h are connected across the channel 10 to output bit lines 32a–32h. The spare link 19a has been switched into the channel 10 and provides the connection between input bit line 28a and output bit line 32a.

If another failure occurs, the recovery process is implemented again. Since there is an insufficient number of spare links to handle the second failure, it is clear that recovery from the failure is impossible. However, the failures will be mapped to certain desirable locations in the channel. This is shown in FIG. 4.

Figure 4:
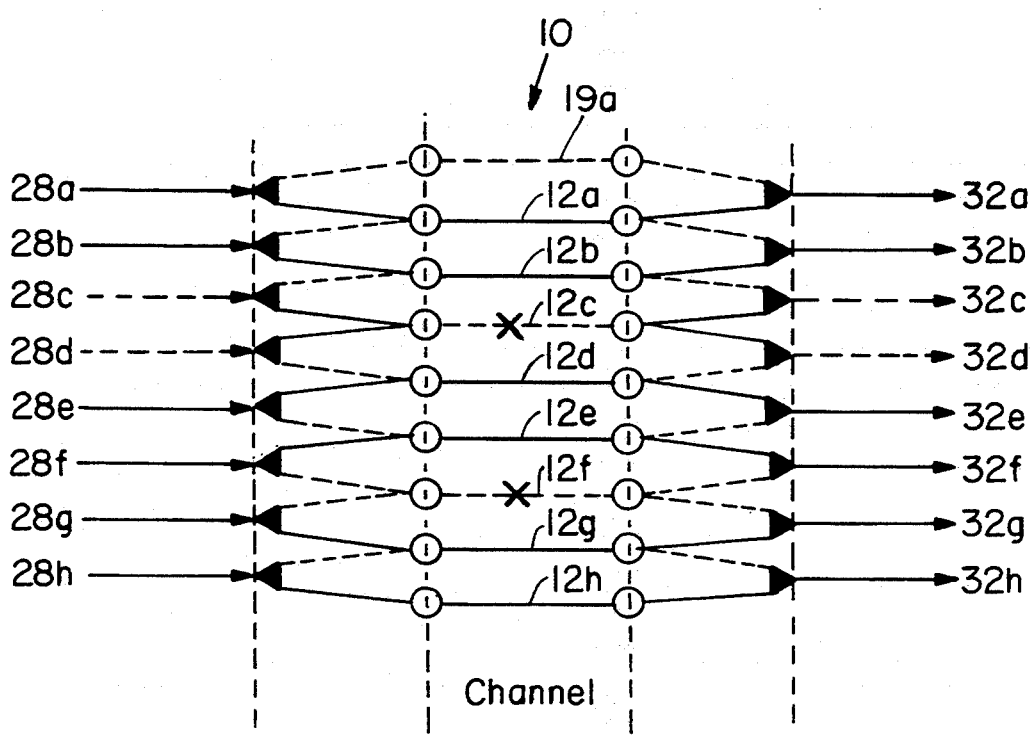
FIG. 4 is a schematic diagram showing the substitution switch of FIG. 2 after two channel link failures.

In FIG. 4, in addition to the failure on link 12f, link 12c has also failed. The recovery process again begins at the bottom link. Switch points remain in the down state until the first failure is reached. Then, switch points above the failure are inverted until the second failure is reached. After passing the second failure, the states of the switch points are no longer inverted. The result of the recovery process is that the two switch points below the first failure are in the down state, the three switch points between the first and second failures are in the up state, and the three switch points above the second failure are in the down state. Since the number of failures exceeds the number of the spare links, the complete set of all of the input bit lines 28a–28h is no longer connected across the channel 10 to output bit lines 32a–32h. Two of the input bit lines 28c and 28d and two output bit lines 32c and 32d are connected to a failed link 12c. Therefore, they have become inactive and are shown as dotted lines. While the switch is unable to recover from the two failures, it has mapped them to adjacent input and output bit lines to form an adjacent switch failure pair. This ability of the substitution switch to map link failures to adjacent failure pairs is an important feature of the invention as will be discussed below in detail.

It can also be noted from FIG. 4 that the substitution switch shown cannot handle switching of more than one spare link. Each of the input and output bit lines is connected to a switch point, and each switch point has connections to both of its ports. Therefore, even if more spare links could be added, the logic of the switch points could not manipulate them to bypass failed links.

Figure 5:
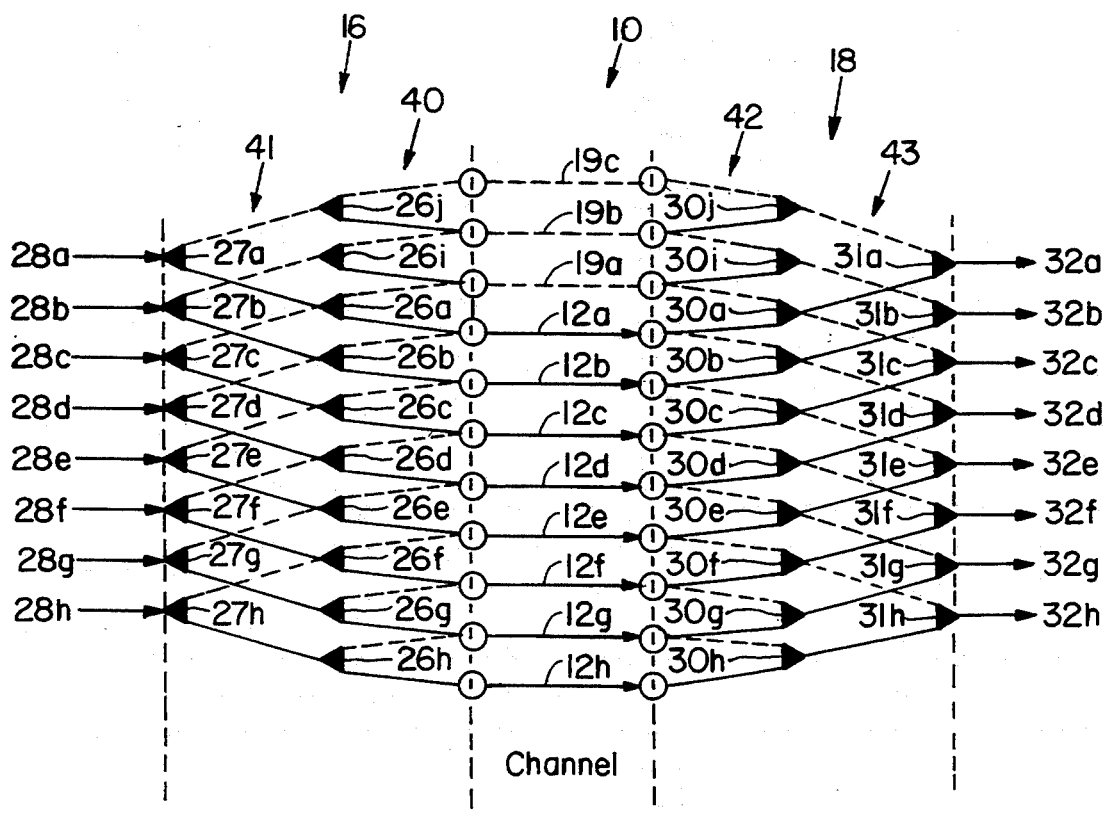
FIG. 5 is a schematic diagram of a two-stage substitution switch in accordance with the present invention connected to a communication channel.

FIG. 5 shows a two-stage substitution switch which is capable of handling up to three spare links 19a–19c. As in the one-stage case, the two-stage substitution switch has a transmit side 16 and a receive side 18. The first stage of the two-stage switch is made up of the transmit side first stage 40 and the receive side first stage 42. The second stage is made up of the transmit side second stage 41 and the receive side second stage 43.

The number of spare links which can be handled by a substitution switch in accordance with the present invention is determined by the number of stages in the switch. An n-stage substitution switch can handle up to $2^n-1$ spare links and can reconfigure the channel for full operation after any set of $2^n-1$ links have failed. Thus, a two-stage switch as shown in FIG. 5 can handle up to three spare links and, therefore, up to three failed links.

In the system of FIG. 5, the communication channel 10 includes eight communication links 12a–12h as well as the three spare links 19a–19c. The first stage 40 of the transmit side 16 includes demultiplexers 26a–26h plus two additional demultiplexers 26i and 26j connected to the new additional spare links 19b and 19c. The second stage 41 of the transmit side 16 includes demultiplexer circuits 27a–27h. These second-stage demultiplexers receive inputs from the system input bit lines 28a–28h. The receive side first stage 42 includes multiplexer circuits 30a–30h plus two additional multiplexers 30i and 30j to accommodate the additional spare links 19b and 19c. The second stage 43 of the receive switch 18 includes multiplexer circuits 31a–31h, the outputs of which are the output bit lines 32a–32h of the communication path.

Figure 6:
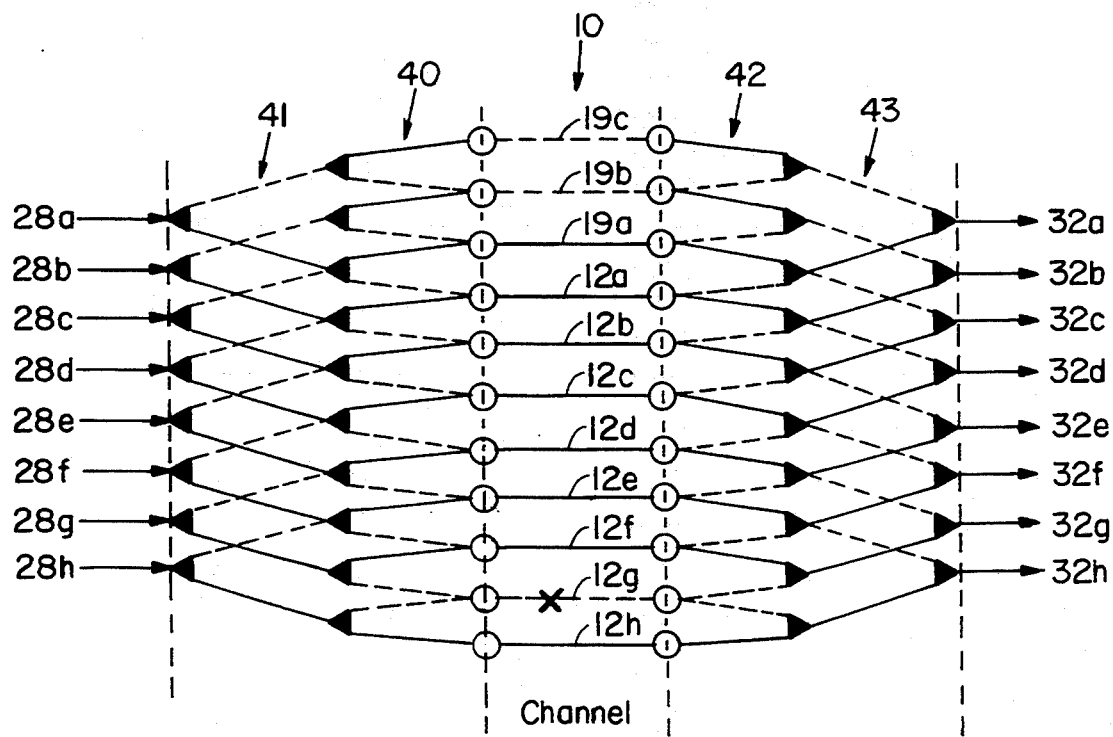
FIG. 6 is a schematic diagram of the substitution switch of FIG. 5 after a single link failure.

Under normal operating conditions with no failed channel links, the substitution switch is configured as shown with all switch points in the down position. That is, the lower ports of all demultiplexers and multiplexers are active. FIG. 6 shows the configuration of the substitution switch after a single link 12g has failed. To recover from the failure, the first stage of the substitution switch implements the recovery process used by the single-stage substitution switch. Thus, the switch point below the failure is in the down state, and all of the switch points above the failure are in the up state. The input bit lines 28a–28h are connected to the output bit lines 32a–32h across links 19a, 12a–12f and 12h. Since there is only one failure, only one of spare links, 19a, is used. It should also be noted that since only a single failure has occurred, only a single-stage substitution switch is needed to recover. Consequently, only the first stage of the substitution switch is affected by the failure.

Figure 7A:
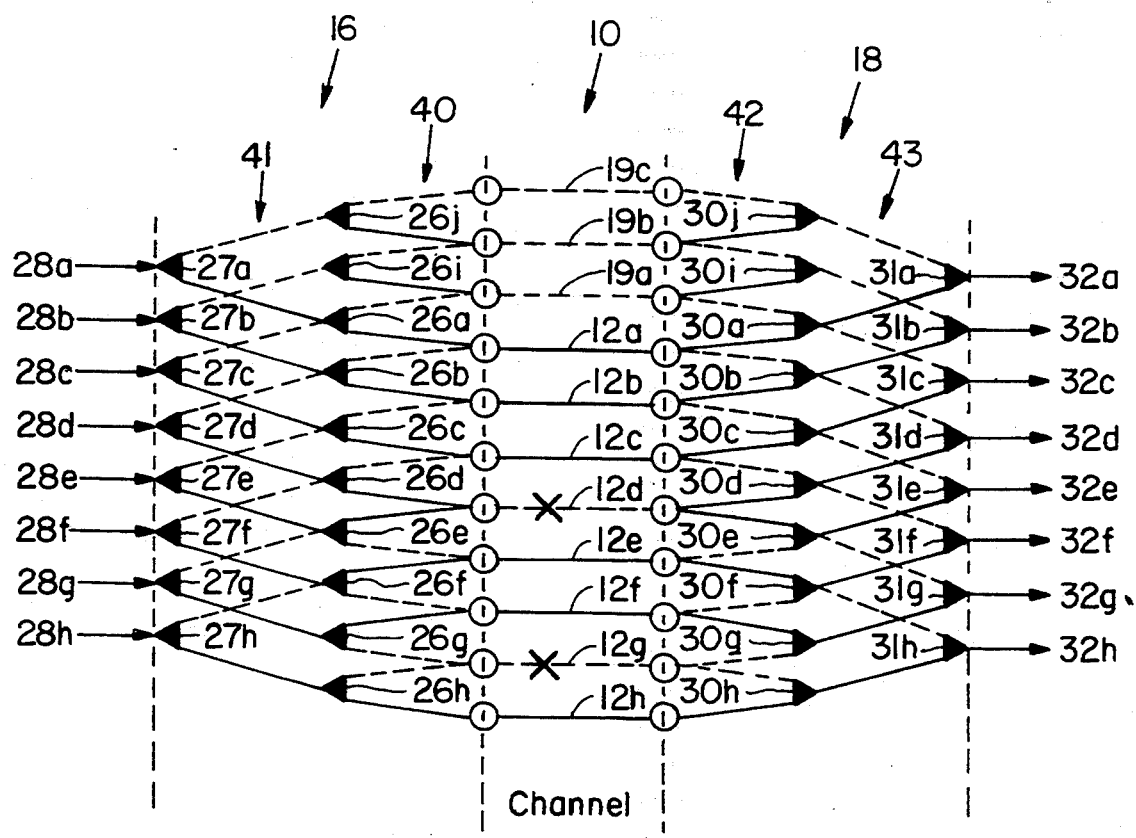
FIG. 7A is a schematic diagram of the substitution switch of FIG. 5 after a first step of the recovery process where two links in the channel have failed.
Figure 7B:
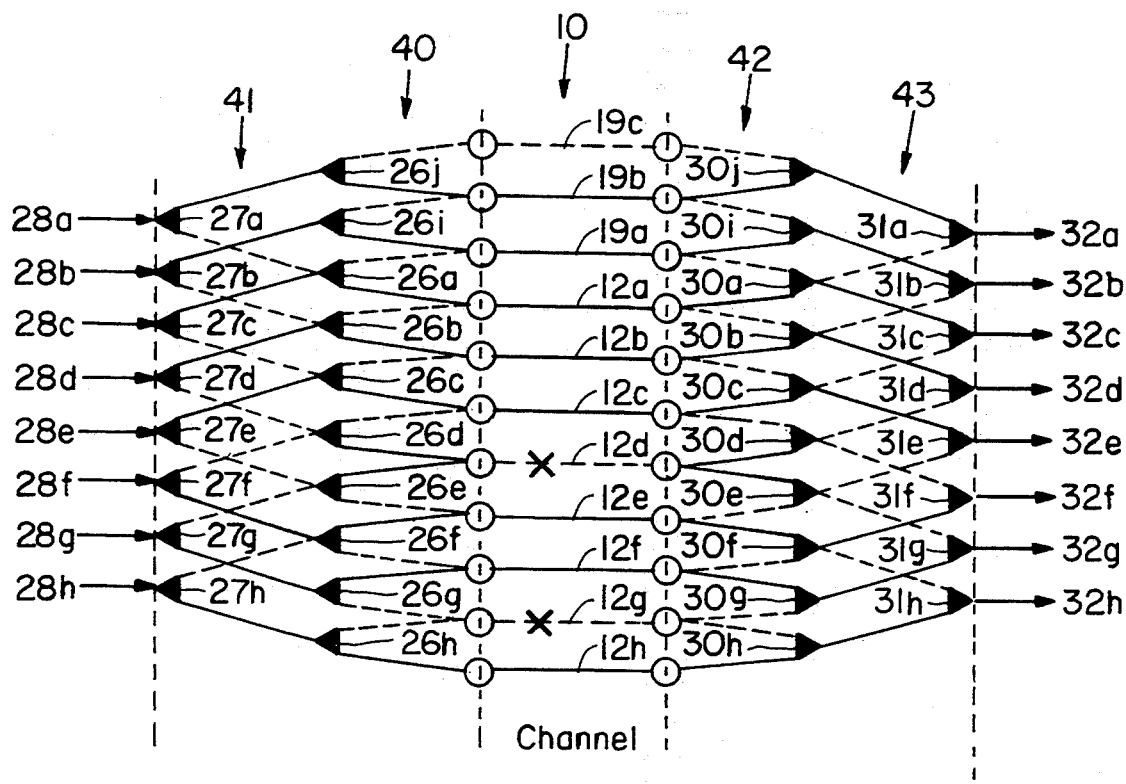
FIG. 7B is a schematic diagram of the substitution switch of FIG. 7A after the final step in the recovery process.

FIGS. 7A and 7B show recovery by the two-stage substitution switch from two failures at links 12d and 12g. Since there are now two failures, two spare links will be used, and the second stage of the substitution switch will be affected. FIG. 7A shows the result of the first step in the recovery process. The bottom first-stage switch point 26h, 30h is in the down state. The next switch point 26g, 30g is switched to the up position since it is above the first failure. The next two switch points 26f, 30f and 26e, 30e are in the up position because they are above the first failure. After passing the second failure at link 12d, the switch points are again inverted such that all of the switch points above the second failure are in the down state. The result of this first step of the process is that the two failures are mapped to adjacent switch points in the first stage of the substitution switch. In particular, the switch point 26e, 30e and the adjacent switch point 26d, 30d are both connected to the failed link 12d. Therefore, they form an adjacent failure pair in the first stage of the substitution switch.

As shown in FIG. 7B, the next and final step in the recovery process is performed to reconfigure the second stage 41, 43 of the substitution switch to bypass the adjacent failure pair. The process used to configure the second stage is similar to that used for the first stage. All of the switch points in the second stage begin in the down state. The second-stage switch points above the adjacent failure pair are inverted such that they are in the up state. Thus, the three second-stage switch points below the adjacent failure pair are in the down state, and the second-stage switch points above the center of the first stage failure pair are in the up state.

As shown in FIG. 7B, after executing the recovery process as described above, the failed links 12d and 12g are bypassed such that the communication channel 10 can continue to operate. Spare links 19a and 19b have been switched into the channel 10. All of the input bit lines 28a–28h are connected across the channel via spare links to the output bit lines 32a–32h. Thus, the process uses the first stage of the substitution switch to map the failure into an adjacent failure pair and uses the second stage to eliminate the failure pair from the communication path.

Figure 8A:
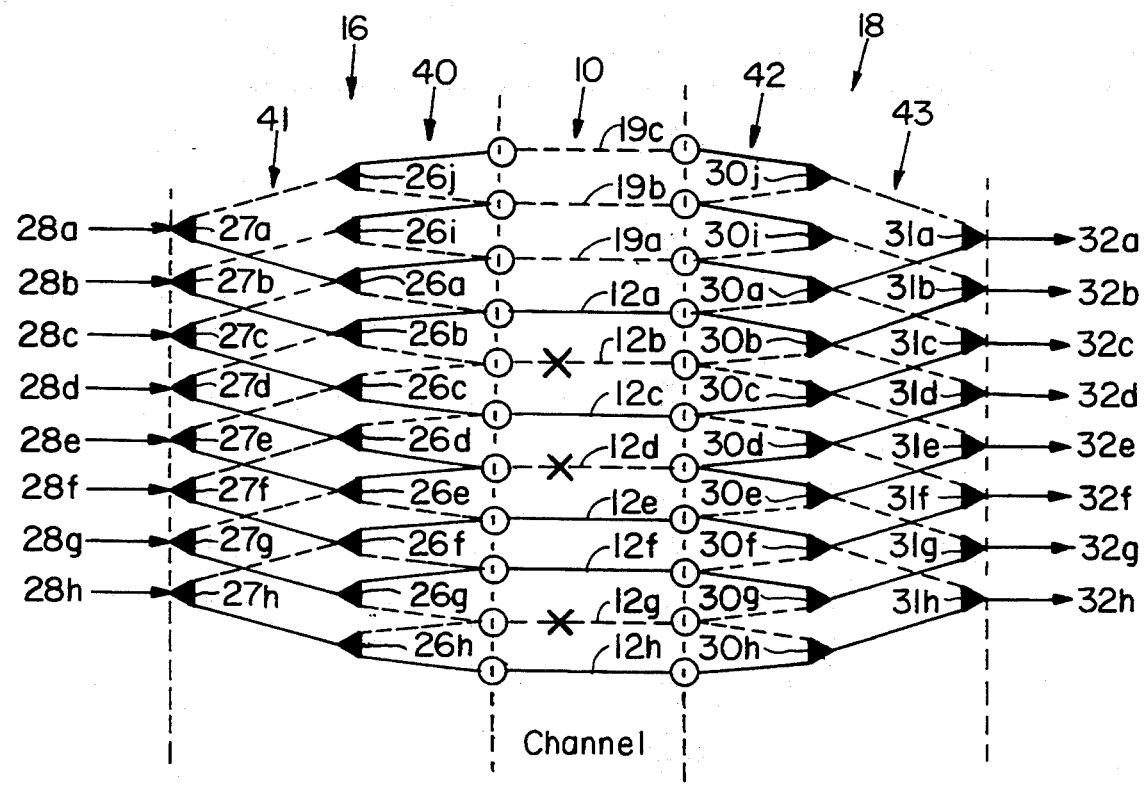
FIG. 8A is a schematic diagram of the substitution switch of FIG. 5 after the first step of the recovery process where three links have failed.
Figure 8B:
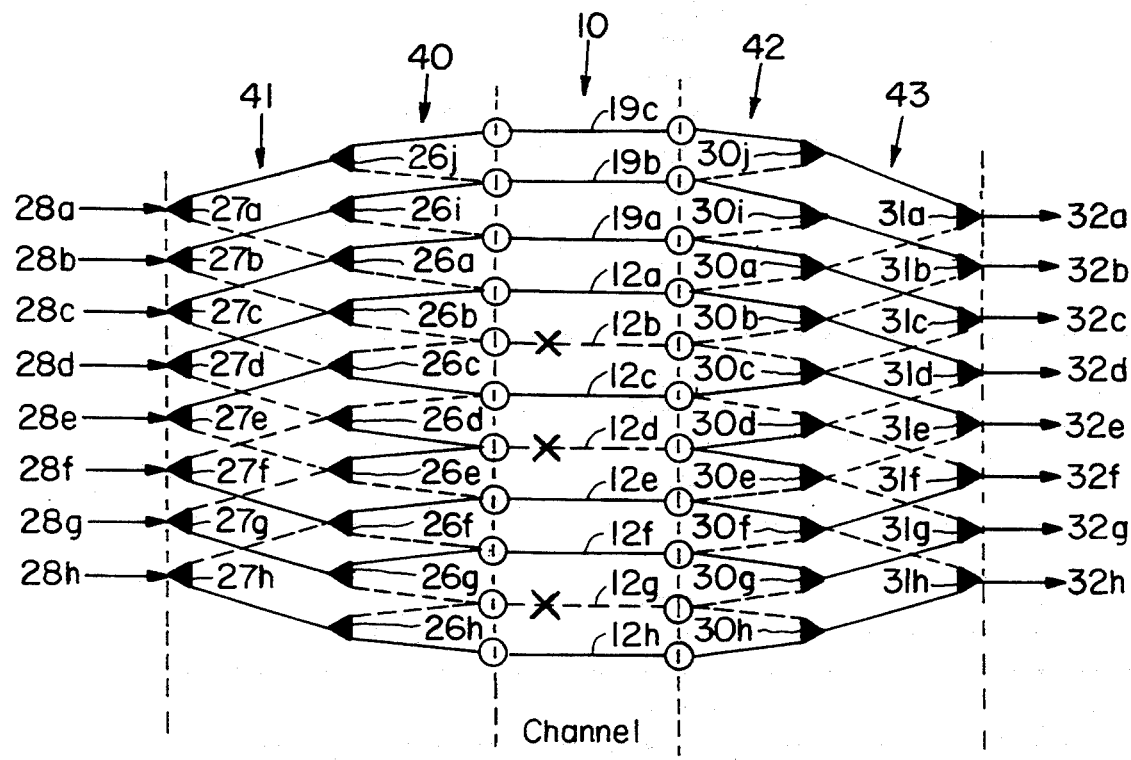
FIG. 8B is a schematic diagram of the substitution switch of FIG. 8A after the final step in the recovery process.

FIGS. 8A and 8B show the recovery process after a third failure occurs at link 12b. FIG. 8a shows the result of the first-stage recovery process. As with the two-failure case of FIGS. 7A and 7B, an adjacent switch point failure pair has been created at switch points 26e, 30e and 26d, 30d. FIG. 8B shows the configuration of the switch after the second step of the recovery process has been implemented. All three spare links 19a–19c have been switched into the channel and, consequently, all three failures have been eliminated. Input bit lines 28a–28h are connected across the switch and channel 10 to output bit lines 32a–32h.

Figure 9A:
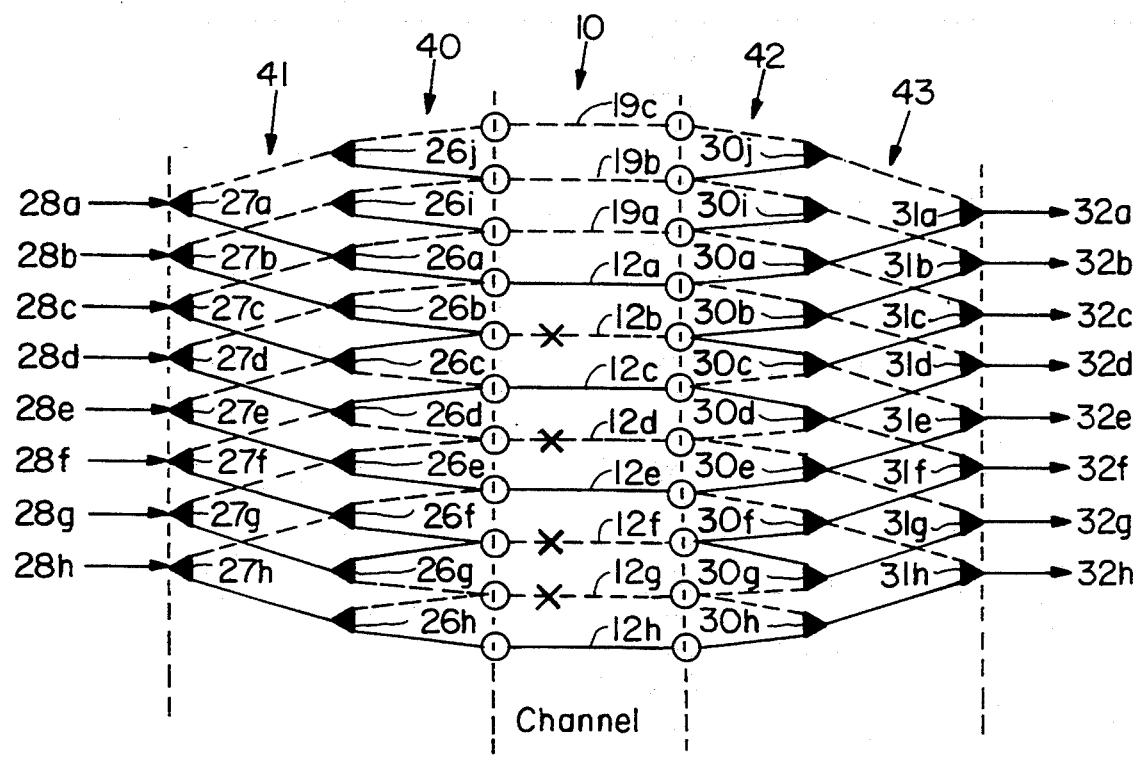
FIG. 9A is a schematic diagram of the substitution switch of FIG. 5 after the first step in the recovery process where four links have failed.
Figure 9B:
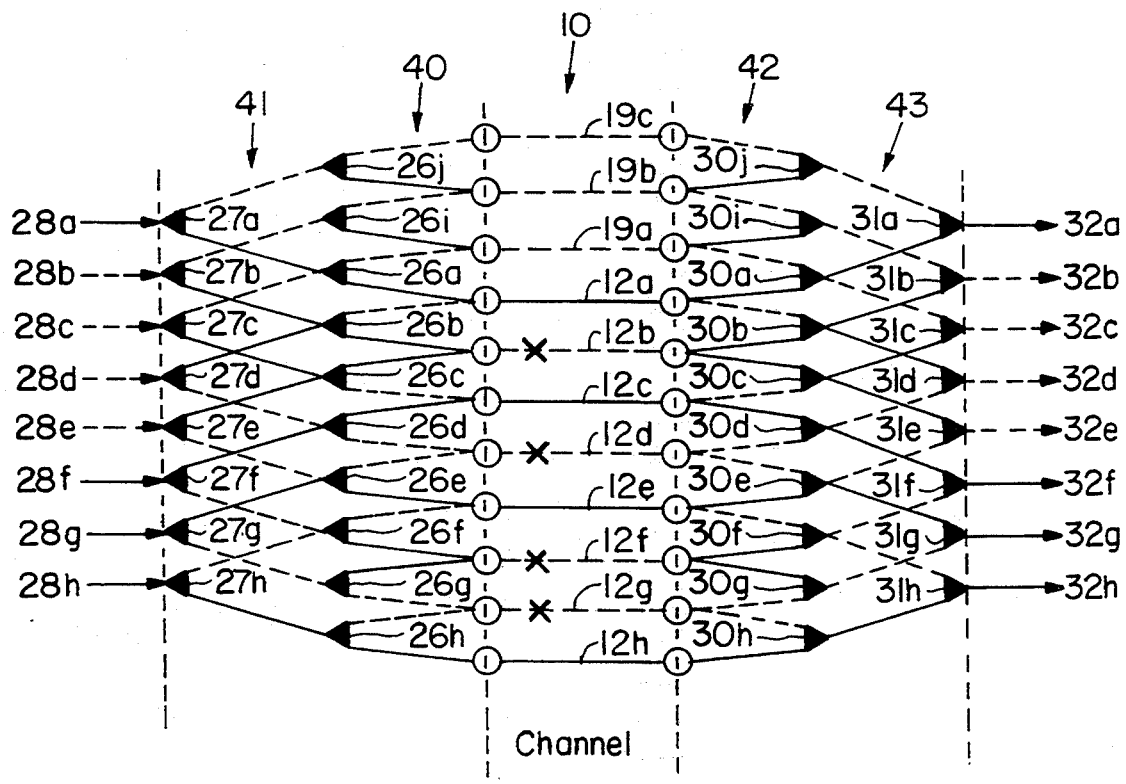
FIG. 9B is a schematic diagram of the substitution switch of FIG. 9A after the final step in the recovery process.

FIGS. 9A and 9B show the same switch and channel after a fourth failure occurs at link 12f. Because there are more failures than spare links, the network is incapable of completely recovering from the failures. Thus, the effective width of the channel is necessarily reduced by the failures. FIG. 9A shows the configuration of the switch after the first step of the recovery process has been executed. An adjacent switch point failure pair has been created at switch points 26g, 30g and 26f, 30f. In addition, a second adjacent switch point failure pair is created at 26c, 30c and 26b, 30b.

FIG. 9B shows the switch after the second step in the process has been implemented. The failure pair connected across link 12f has been eliminated. However, because of the inadequate number of spares, the failure pair connected across link 12b cannot be eliminated. Instead, it is mapped into a failure quadruplet of input and output bit lines. Input bit lines 28b–28e are no longer connected across the channel to output bit lines 32b–32e. In this case, the effective channel width is reduced to half its original width.

In the same way that the second stage of the substitution switch eliminated adjacent failure pairs, a third stage of the substitution switch, if implemented, could eliminate a failure quadruplet, and map additional failures into a failure octuplet. A fourth stage, if implemented, could eliminate a failure octuplet. In this manner, an n-stage substitution switch can handle up to $2^n-1$ spares and eliminate up to $2^n-1$ failures, as mentioned above.

Figure 10:
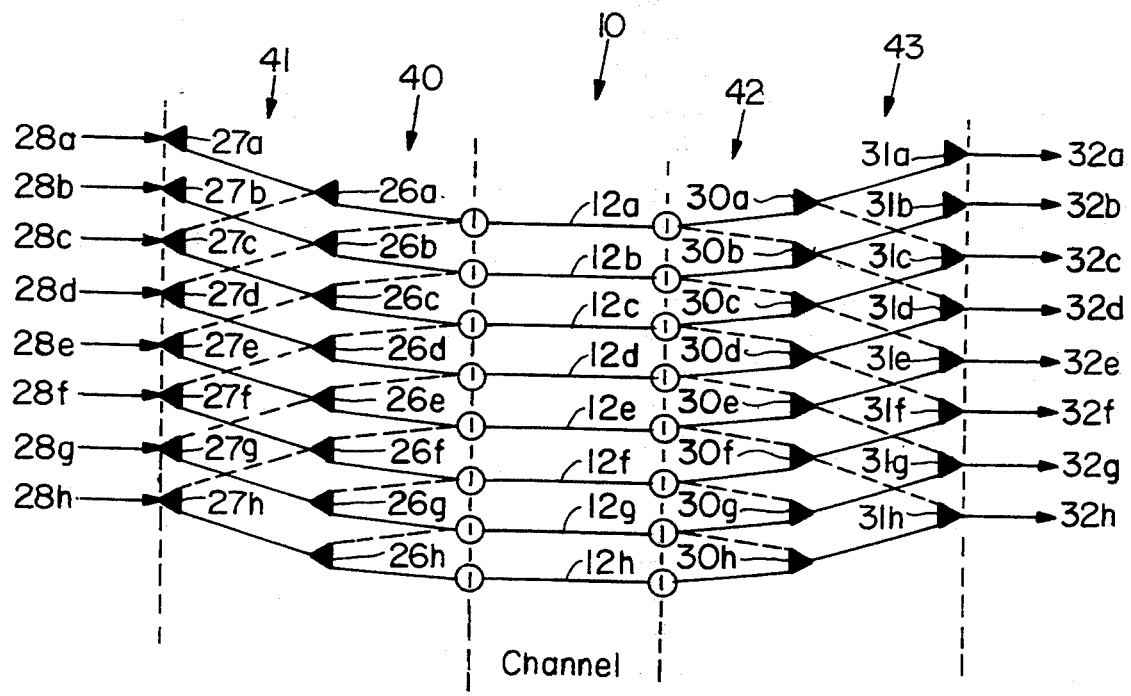
FIG. 10 is a schematic diagram of a two-stage substitution switch in accordance with the present invention in which no redundant spare links are provided.

FIG. 10 shows the two-stage substitution switch with no spare links included in the channel 10. In this configuration, rather than bypassing failed links with spare links, the substitution switch will map failed links to desired bit lines in the communication path. Specifically, failed links will be mapped to the highest available bit line.

Figure 11A:
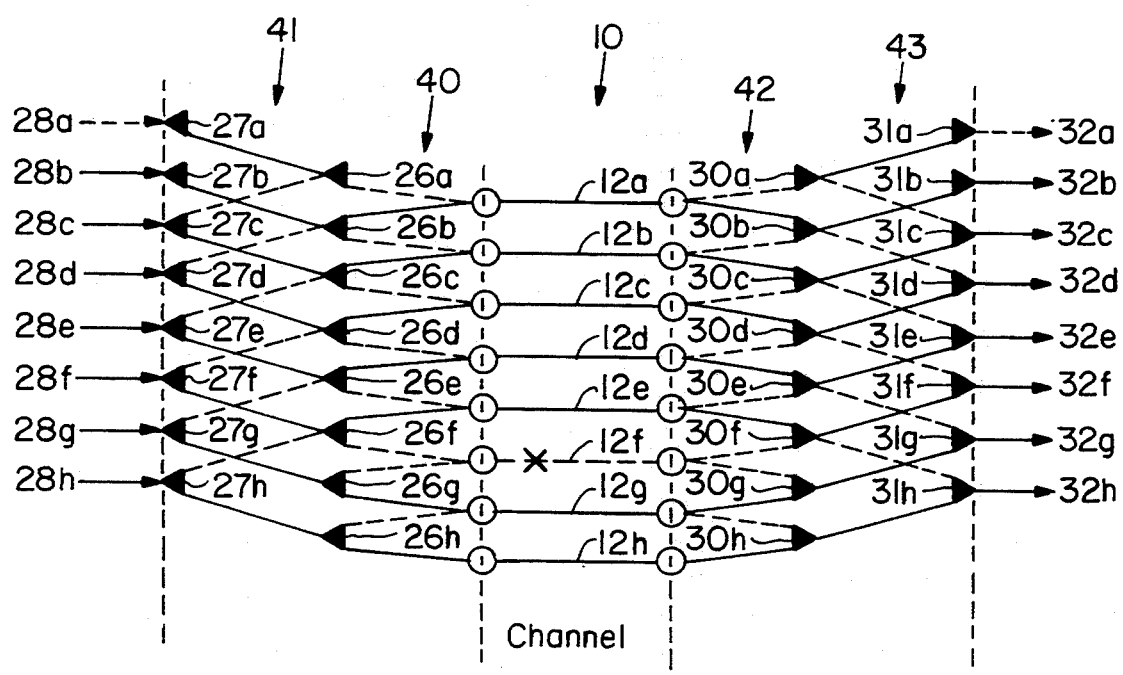
FIG. 11A is a schematic diagram of the substitution switch of FIG. 10 after a single link failure.
Figure 11B:
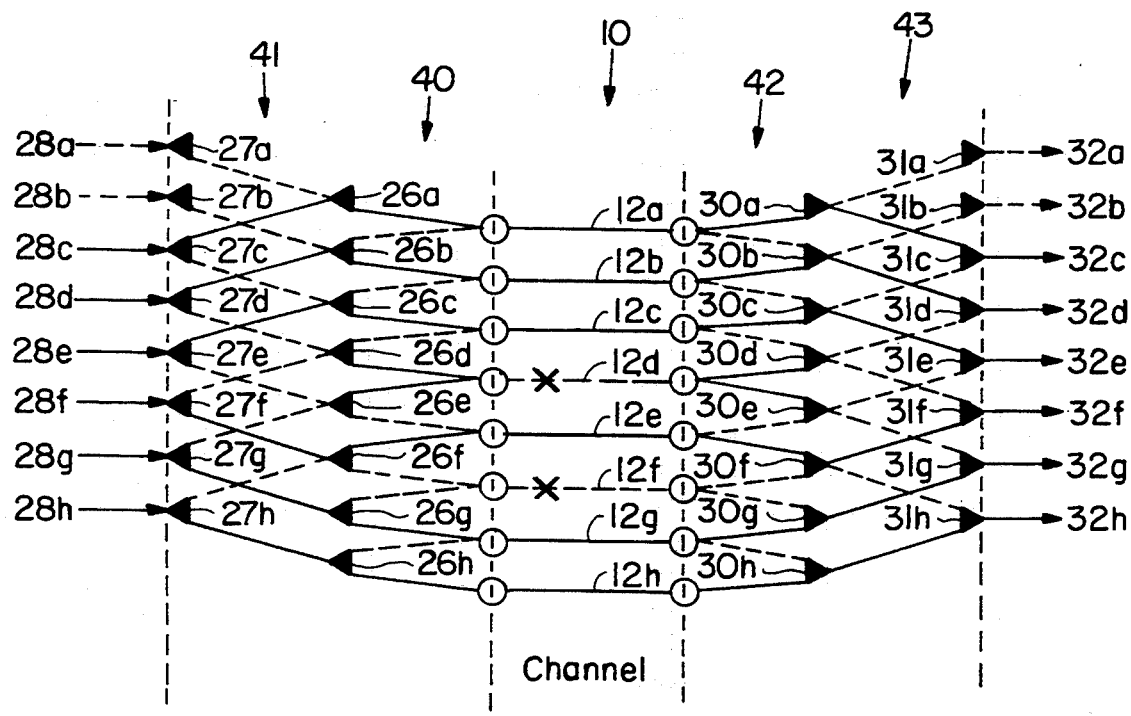
FIG. 11B is a schematic diagram of the substitution switch of FIG. 10 after two link failures.
Figure 11C:
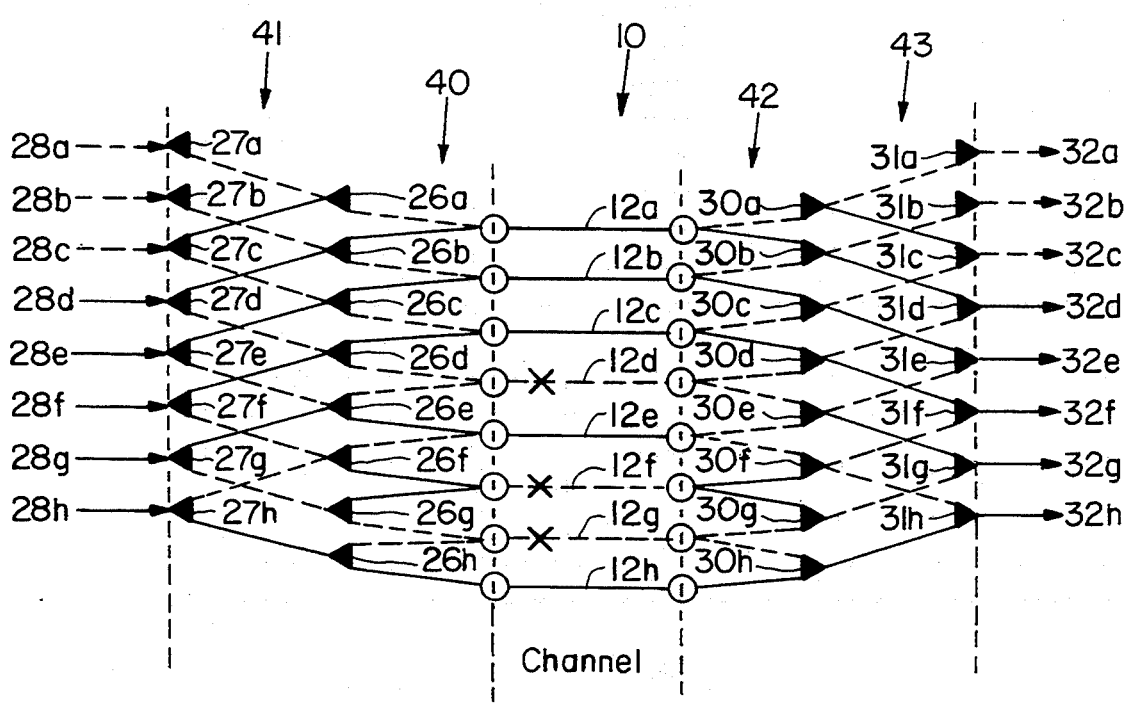
FIG. 11C is a schematic diagram of the substitution switch of FIG. 10 after three link failures.

FIGS. 11A–11C illustrate the process of mapping failed links. In FIG. 11A, only the single link 12f has failed. In the first step of the recovery process, the first stage of the substitution switch is configured such that the switch points above the failed link are in the up state and those below the failed link are in the down state. If spare links were included in the channel 10, the top switch point would route communications across the first spare link. However, since no spare links are provided, no communication can take place across the top switch point. In the second step of the process, the second stage of the switch is configured. Since there are no adjacent switch point failure pairs, all of the second-stage switch points are in the down state. Because the top first-stage switch point cannot provide a communication path, input bit line 28a is no longer connected to output bit line 32a. The remaining input bit lines 28b–28h, however, are connected across the channel 10 to the output bit lines 32b–32h. Thus, the failure of the link 12f has been mapped to the top input and output bit lines 28a, 32a.

FIG. 11b shows the substitution switch and channel 10 after a second link 12d has failed. The first stage of the substitution switch shows an adjacent switch point failure pair at 26e, 30e and 26d, 30d. In the second stage of the switch, the switch points below the adjacent switch point failure pair are in the down state, and those above it are in the up state. The result is that the two failures are mapped to the two top input bit lines 28a, 28b and output bits lines 32a and 32b. Input bit lines 28c–28h remain connected across the channel 10 to output bit lines 32c–32h. The two failures have been mapped to the two top bit lines.

FIG. 11C shows the switch and channel after a third link 12g has failed. A failure pair appears in the first stage at 26g, 30g and 26f, 30f. The second stage switch points above the failure pair are in the up state and the switch point below the failure pair is in the down state. The three failures are mapped to the three top input bit lines 28a–28c and output bit lines 32a–32c. Input bit lines 28d–28h remain connected across the channel 10 to output bit lines 32d–32h.

As mentioned previously, the channel width reduction switch of the present invention allows communication across a channel 10 to continue after one or more communication links on the channel have failed by time multiplexing the bits in a data word to be transmitted. The channel width reduction switch operates when the failed links are in particular required positions on the channel 10. In a preferred embodiment of the invention, a substitution switch as previously described is placed between the channel width reduction switch and the channel 10 in order to map failed links to the desired positions. In the interest of clarity and ease of illustration, the channel width reduction switch will be described first without the substitution switch. Then, the function of the entire communication system including both switches will be described.

Figure 12:
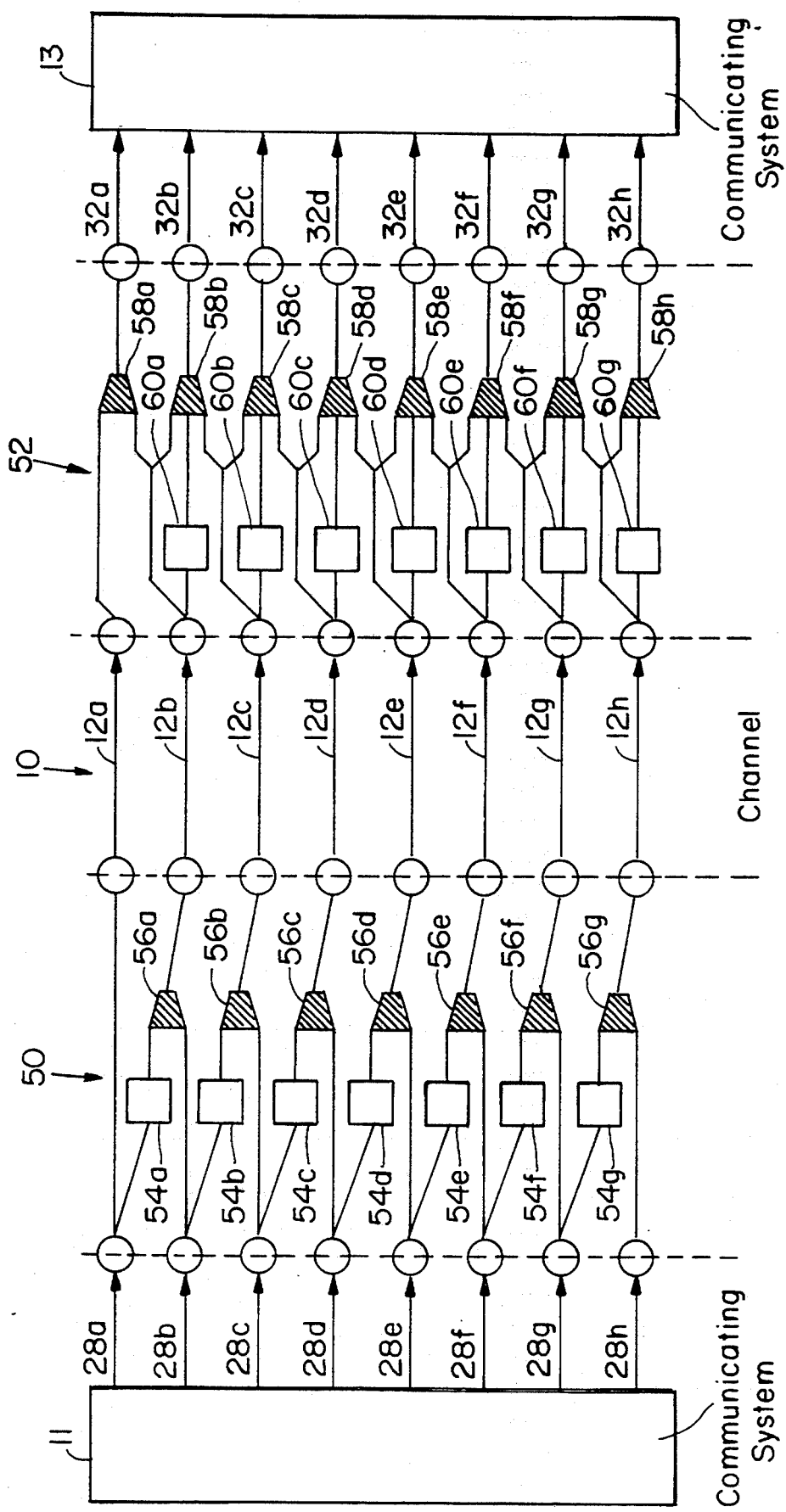
FIG. 12 is a schematic diagram of a communication system using a channel width reduction switch in accordance with the present invention.

FIG. 12 shows an eight-bit channel width reduction switch used with an eight-bit communication channel 10 connected between two systems 11 and 13. The channel width reduction switch includes a transmit side 50 located between input bit lines 28a–28h and channel communication links 12a–12h and a receive side 52 connected between the channel communication links 12a–12h and output bit lines 32a–32h. The transmit side 50 of the switch includes seven registers 54a–54g and seven two-input multiplexers 56a–56g. Each register 54a–54g receives as its input a single input bit line 28a–28g. Each multiplexer 56a–56g has as one of its inputs the output from a single corresponding register 54a–54g. The other input to each multiplexer 56a–56g is connected to a corresponding input bit line 28b–28h, respectively. Input bit line 28a is directly connected across the transmit side 50 of the switch to link 12a in the channel 10. Each of the outputs from multiplexers 56a–56g is connected to a link 12b–12h, respectively, of the channel 10.

The receive side 52 of the switch includes eight multiplexers 58a–58h and seven registers 60a–60g. Each of the registers 60a–60g receives as its input a data bit from communication links 12b–12h, respectively. The output of each register 60a–60g is connected to an input of a multiplexer 58b–58h, respectively. Communication link 12a is directly connected to an input of multiplexer 58a. Each of the remaining communication links 12b–12h is directly connected to the inputs of two multiplexers 58a–58h. The outputs of multiplexers 58a–58h are connected to output bit lines 32a–32h, respectively, which are in turn connected to system 13.

Data words to be transferred from system 11 to system 13 appear at the input bit lines 28a–28h. If all of the links 12a–12h in the channel 10 are operating properly, then the lower input port of each multiplexer 56a–56g is active. The data word passes from the input bit lines 28a–28h directly through the transmit side 50 of the switch to the channel 10 and on to the receive side 52 of the switch. In this configuration, the upper port of each multiplexer 58a–58h on the receive side 52 of the switch is active. Therefore, the data bits pass directly through the receive side 52 of the switch to the output bit lines 32a–32h and on to the system 13.

With the registers 54a–54g connected to the input bit lines 28a–28g as shown, when link 12a fails, the channel width reduction switch will allow communication to continue across the channel 10. As described below in detail, in the preferred embodiment, a substitution switch is inserted between the channel width reduction switch and the channel so that link failures can be mapped to the top position of the switch. So, even if it is not the top link which fails, it will appear as such to the channel width reduction switch.

FIGS. 13A–13H illustrate the process of time multiplexing bits on the channel 10 where link 12a has failed. Referring to FIGS. 12 and 13A–13H, the time multiplexing function will now be described in detail. Data words are transmitted across the channel in cycles. In the first cycle shown in FIG. 13A, data word A appears at the bit input lines 28a–28h. Bits $a_0$–$a_7$ appear at bit input lines 28a–28h, respectively. The lower port of each of the multiplexers 56a–56g on the transmit side 50 of the switch are active. Bits $a_1$–$a_7$ pass directly through multiplexers 56a–56g, respectively. They are transmitted across links 12b–12h to the receive side 52 of the switch where they are stored in registers 60a–60g, respectively. At the same time, bit $a_0$ is stored in register 54a on the transmit side of the switch.

Figure 13A:
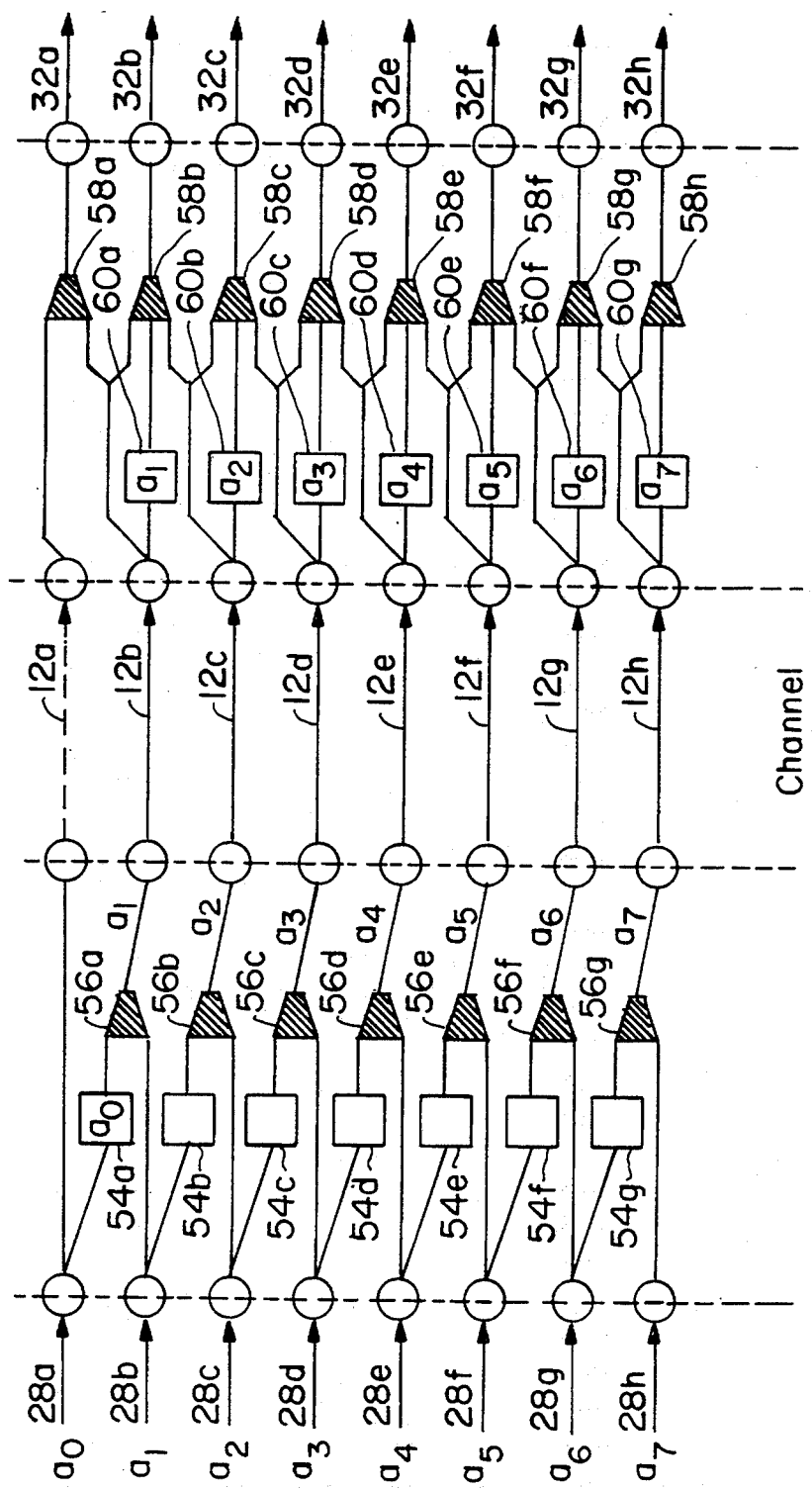
FIGS. 13A–13H illustrate the time multiplexing process of the channel width reduction switch of FIG. 12 where a single link in the channel has failed.
Figure 13B:
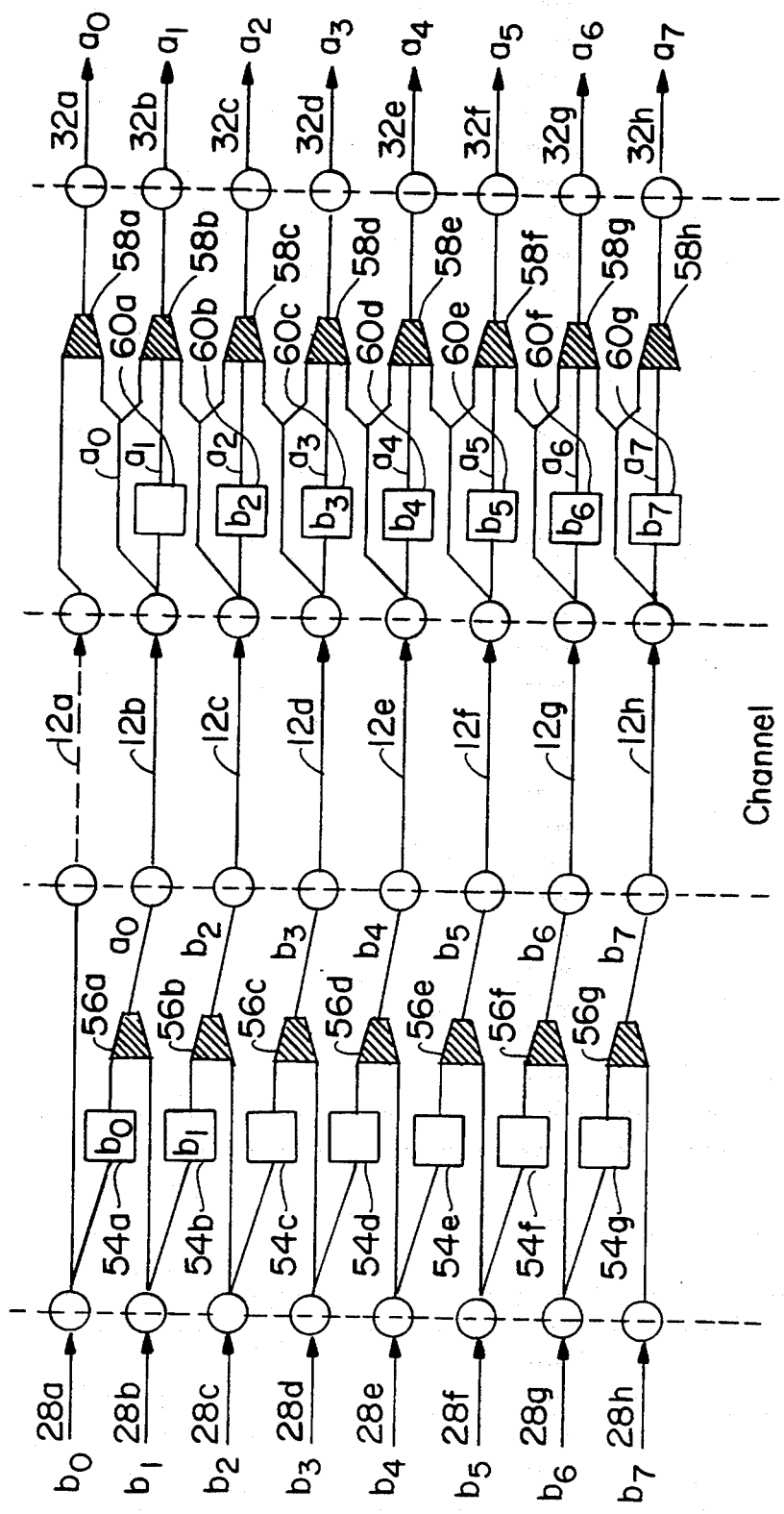

FIG. 13B shows the second transmit cycle in which bits $b_0$–$b_7$ of word B appear at input bit lines 28a–28h, respectively. On the second cycle, the upper port of multiplexer 56a becomes active to transmit bit $a_0$ across the channel on link 12b. At the same time, the lower ports of the remaining multiplexers 56b–56g become active. Consequently, bits $b_2$–$b_7$ are directly transmitted across the channel 10 on links 12c–12h along with $a_0$. The lower port of multiplexer 58a and the middle port of each of multiplexers 58b–58h become active. Bit $a_0$ passes directly through multiplexer 58a to output bit line 32a while bits $a_1$–$a_7$ are output from registers $60_a$–$60_g$. These bits pass through multiplexers 58b–58h to output bit lines 32b–32h. Thus, on the second transmit cycle, the complete word A including bits $a_0$–$a_7$ is output from the switch on the output bit lines 32a–32h. During this second cycle, bits $b_0$ and $b_1$ are stored in transmit side registers 58a and 58b while bits $b_2$–$b_7$ are stored in receive side registers 60b–60g.

Figure 13C:
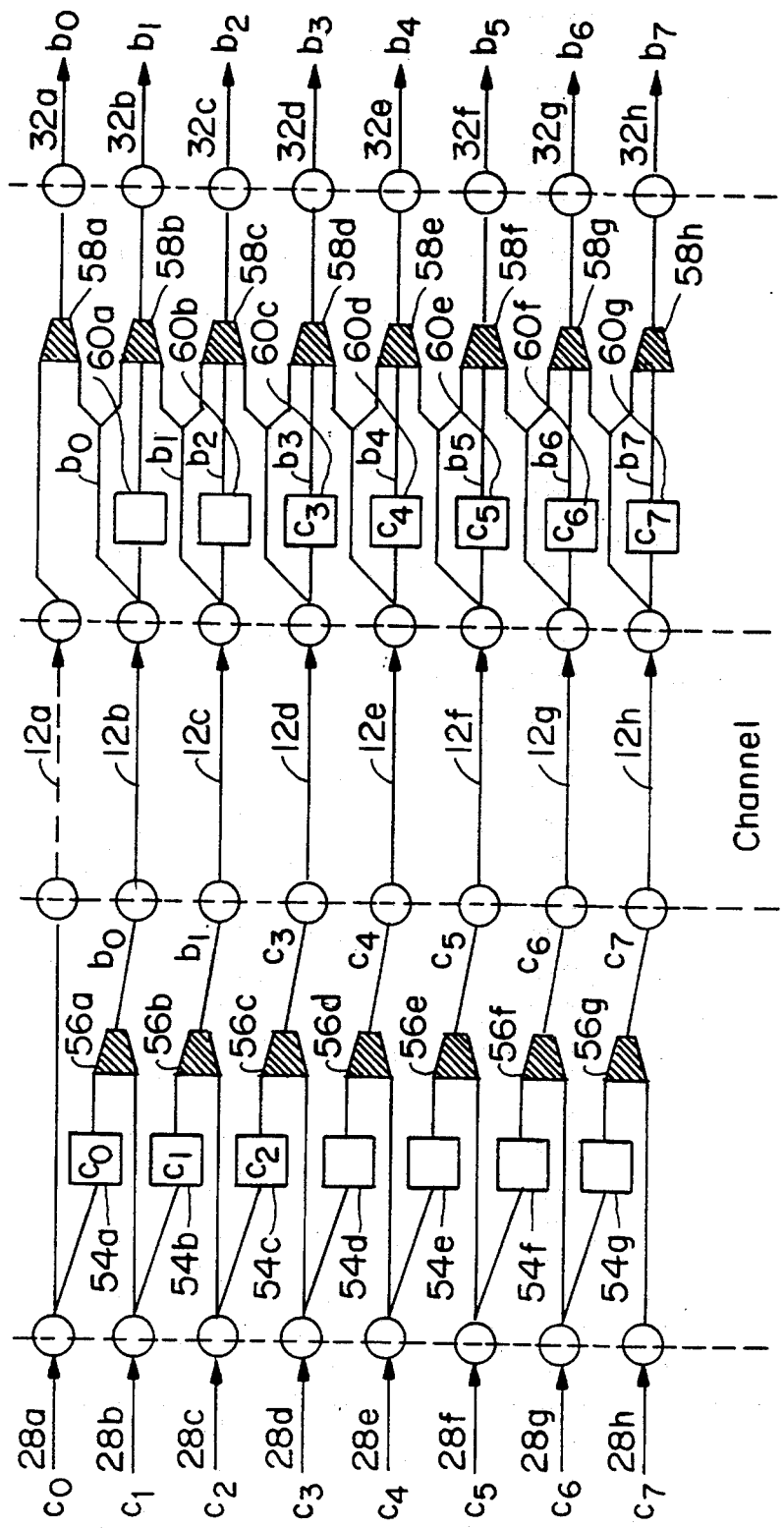

The third cycle is shown in FIG. 13C. Word C appears at the input bit lines 28a–28h. The upper ports of multiplexers 56a and 56b become active to allow bits $b_0$ and $b_1$ to be transmitted across the channel 10 on links 12b and 12c. The lower ports of multiplexers 56c–56g become active so that bits $c_3$–$c_7$ are transmitted directly across the channel 10 along with bits $b_0$ and $b_1$. The lower ports of multiplexers 58a and 58b become active to allow bits $b_0$ and $b_1$ to be transmitted to output bit lines 32a and 32b. At the same time, the middle ports of multiplexers 58c–58h become active to enable bits $b_2$–$b_7$ stored in registers 60a–60g, respectively, to be output to bit lines 32c–32h. Thus, the complete word B is output from the switch. During this cycle, bits $c_0$–$c_2$ are stored in registers 54a–54c on the transmit side the switch. Bits $c_3$–$c_7$ are transmitted directly across the channel where they are stored in registers 60c–60g on the receive side of the switch.

Figure 13D:
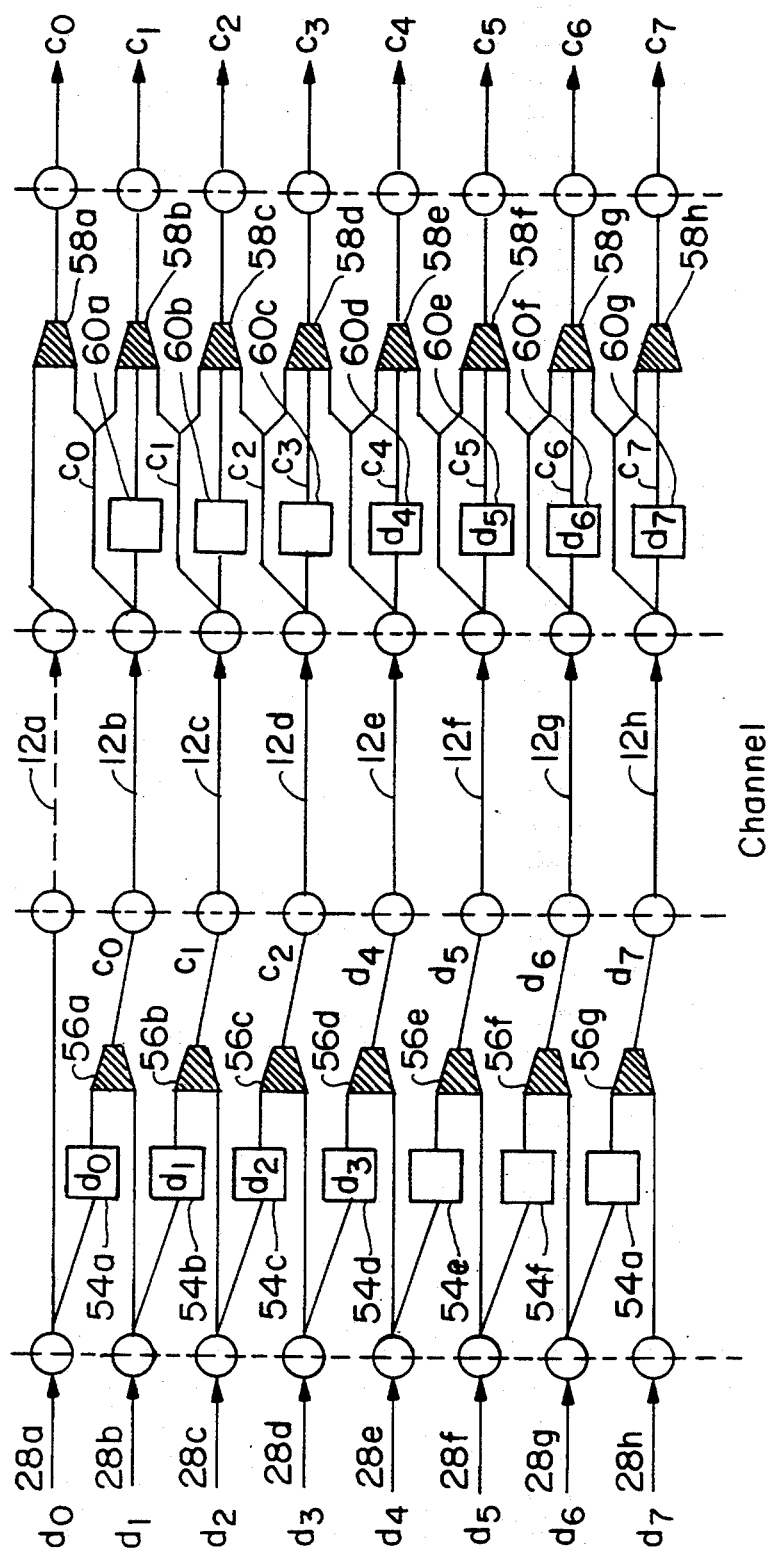
Figure 13E:
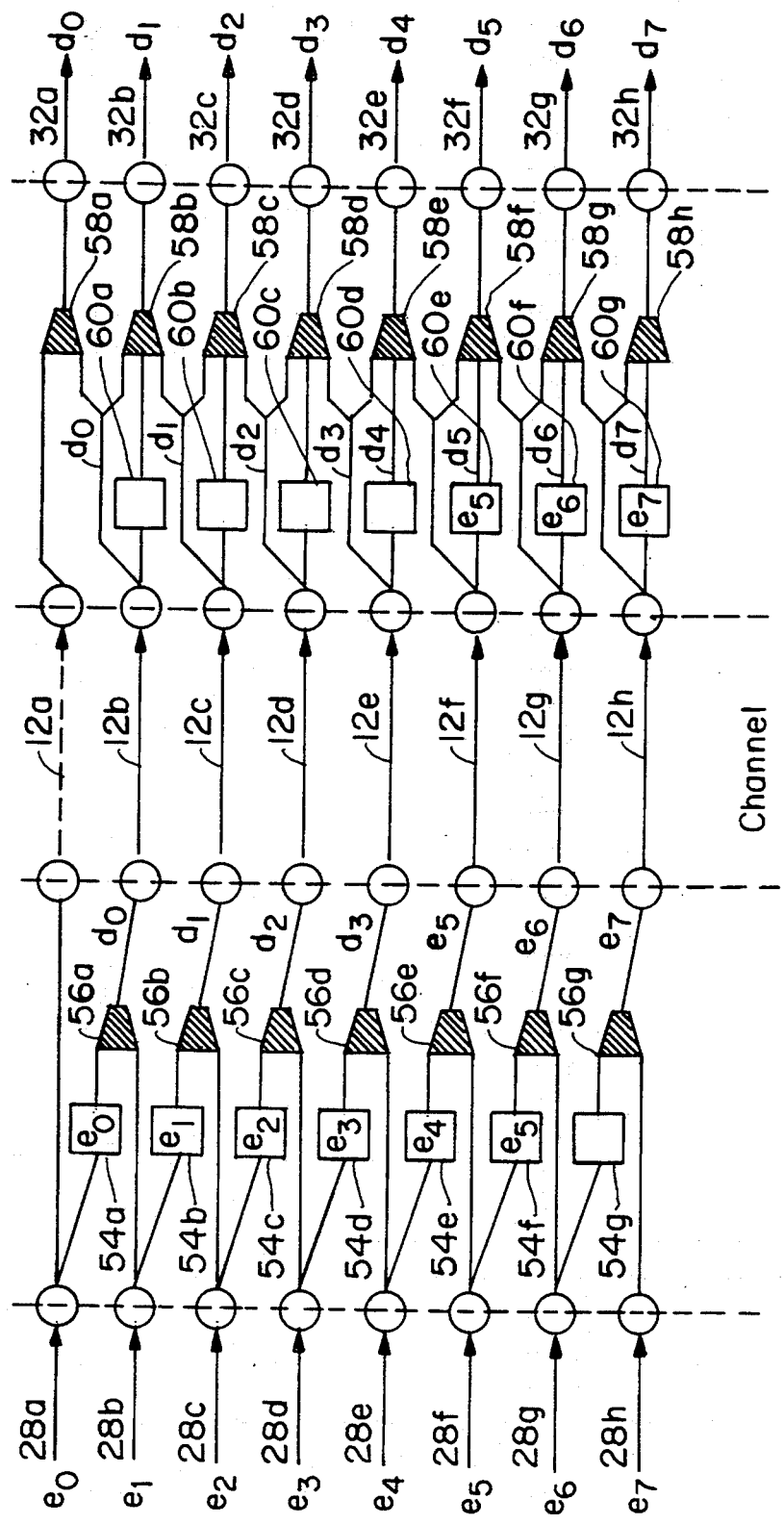
Figure 13F:
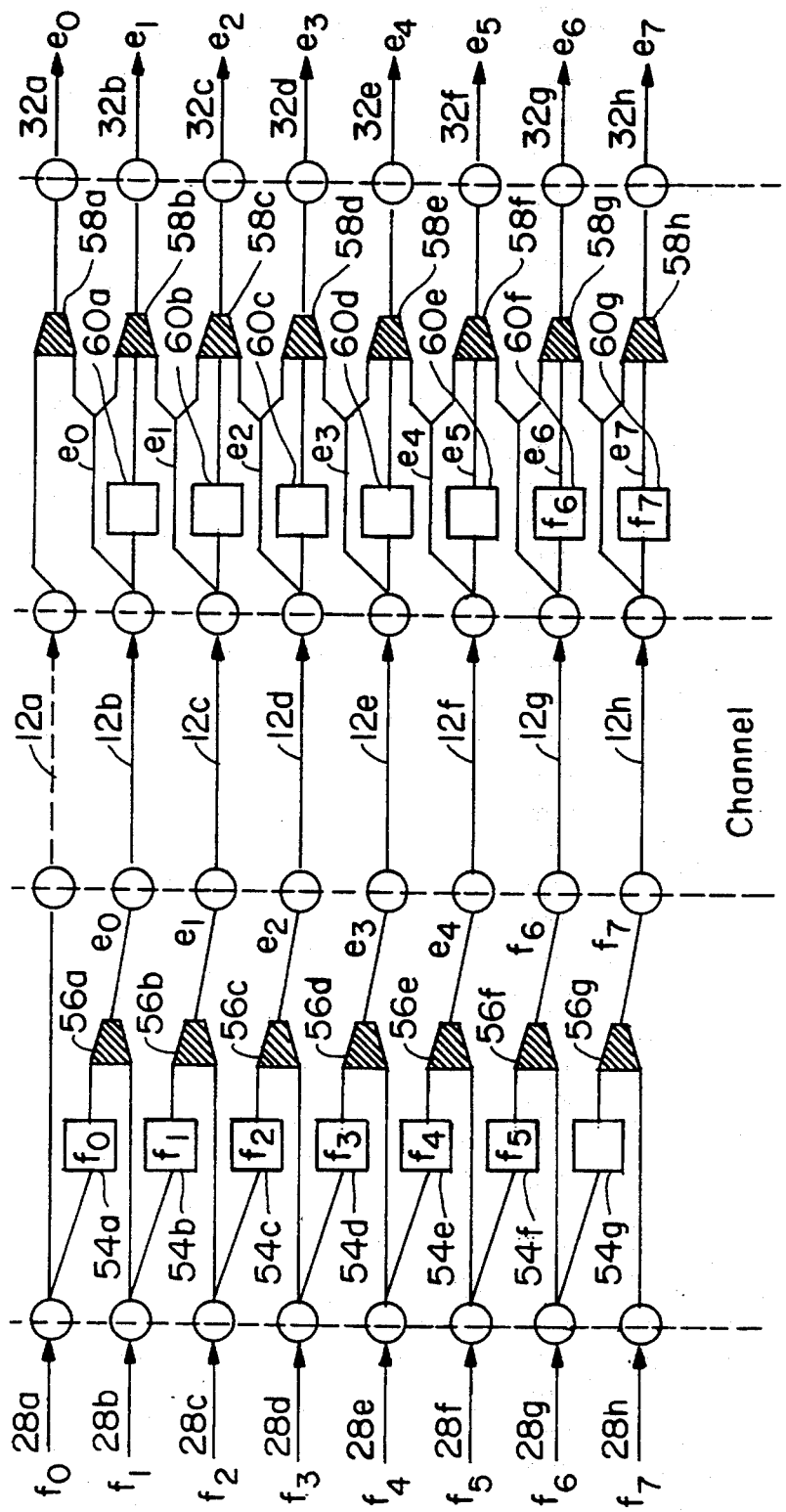
Figure 13G:
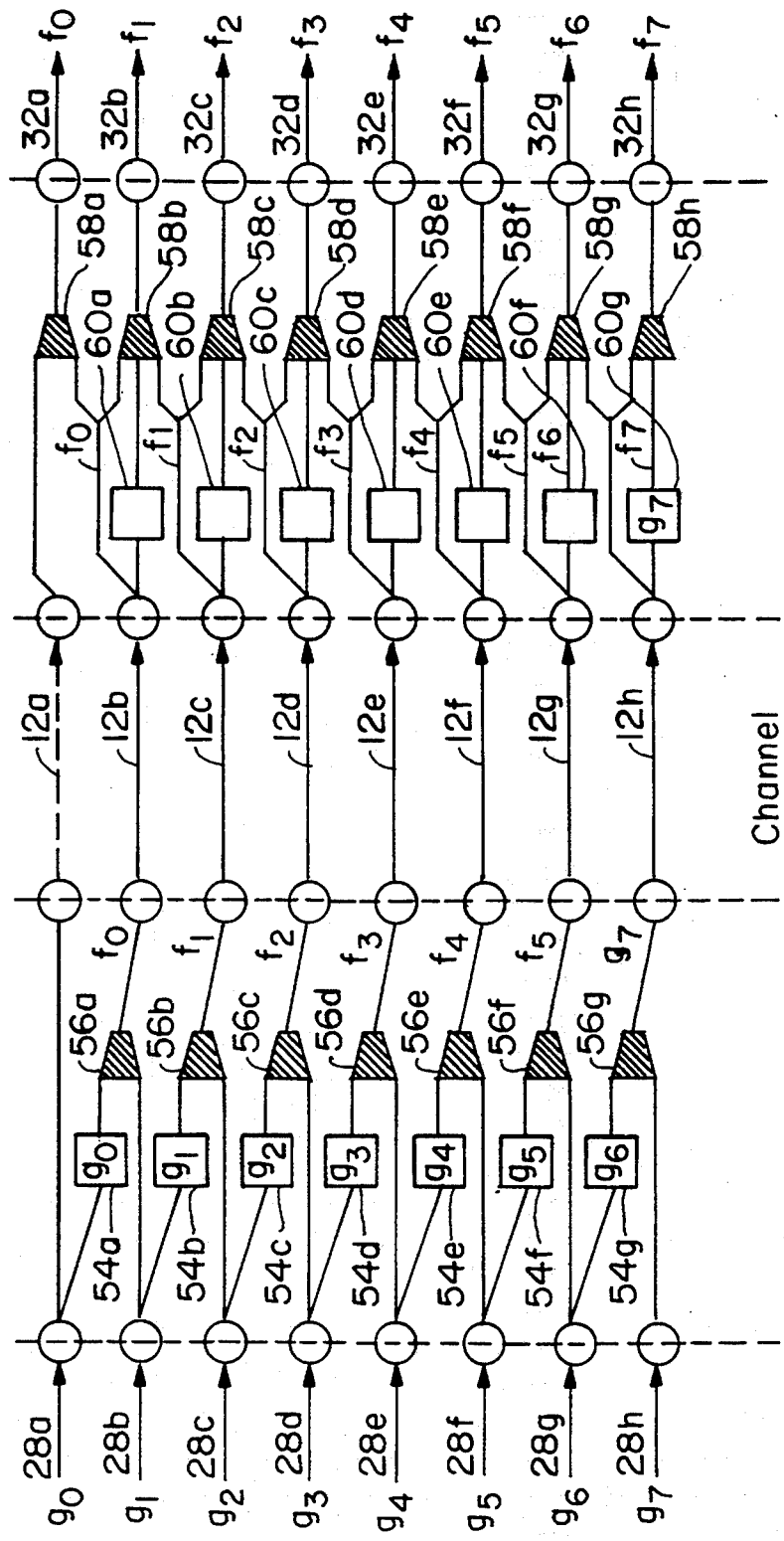

This process continues until the storage capacity on the transmit side 50 of the switch is exhausted. FIG. 13D shows the fourth transmit cycle, FIG. 13E shows the fifth transmit cycle, FIG. 13F shows the sixth transmit cycle, FIG. 13G shows the seventh transmit cycle. On the seventh cycle, each of the registers 54a–54g receives a bit $g_0$–$g_6$ for storage. The lower port of only multiplexer 56g becomes active to directly transmit a single bit, $g_7$, across the channel 10 to the receive side 52 of the switch where it is stored in register 60g.

Figure 13H:
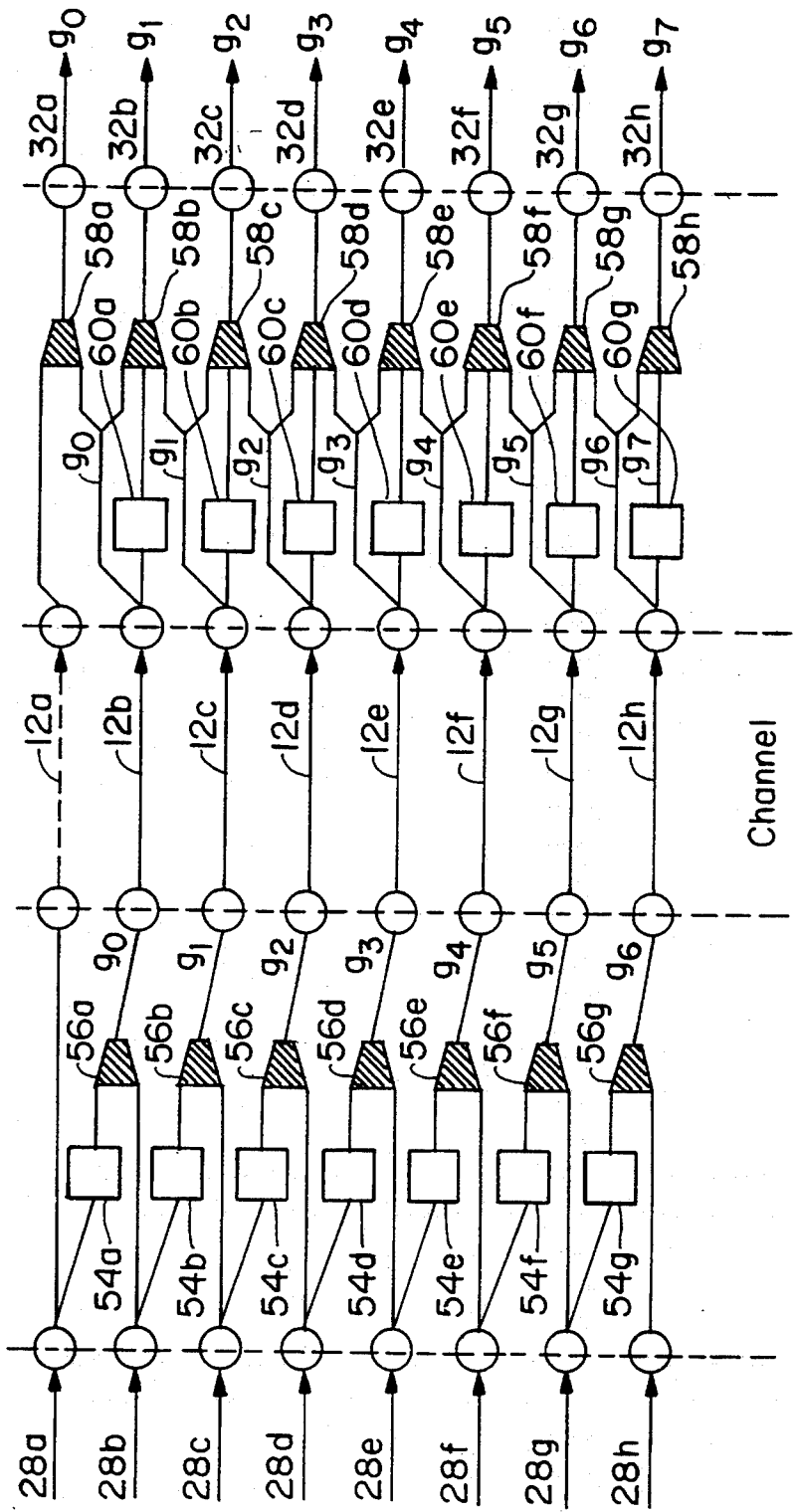

At this point in the process, the switch is unable to handle more data. Therefore, the transmit system 11 is signaled to hold up for a single cycle until bits $g_0$–$g_6$ can be transmitted across the channel 10 to rejoin bit $g_7$. This is shown in FIG. 13H. No word has appeared at the input bit lines 28a–28h. Meanwhile, the upper port of each of the multiplexers 56a–56g is activated to forward bits $g_0$–$g_7$ across the channel 10. The lower port of multiplexers 58a–58g is activated to allow bits $g_0$–$g_6$ to pass through to output bit lines 32a–32g. Simultaneously, the middle port of multiplexer 58h becomes active to allow bit $g_7$ to be read out of register 60g and passed to output bit line 32h. Thus, on the eighth cycle, the seventh word G is output to system 13 on output bit lines 32a–32h.

After this eighth cycle is complete, the above-described process can repeat where an eighth word appears at the input bit lines on the ninth transmit cycle. Thus, the channel width reduction switch allows a channel having seven-eighths of its normal width to transmit data at seven-eighths of its normal transmit speed.

The channel width reduction switch will also allow a channel to operate at three-quarters of its normal channel width. In the present illustration, that is equivalent to continuing operation on the eight-bit channel after two links have failed.

FIGS. 14A–14D show the time multiplexing process of the channel width reduction switch when links 12a and 12e of the channel 10 have failed. Once again, in the preferred embodiment, a substitution switch will be used to map the actual failed links to these positions. In this configuration, the network can be regarded as two four-bit channels, each of whose top link has failed. Each of the four-bit channels behaves like the eight-bit channel described above in connection with FIGS. 13A–13H. In this configuration, register 54d on the transmit side 50 and register 60d on the receive side 52 are not used.

Figure 14A:
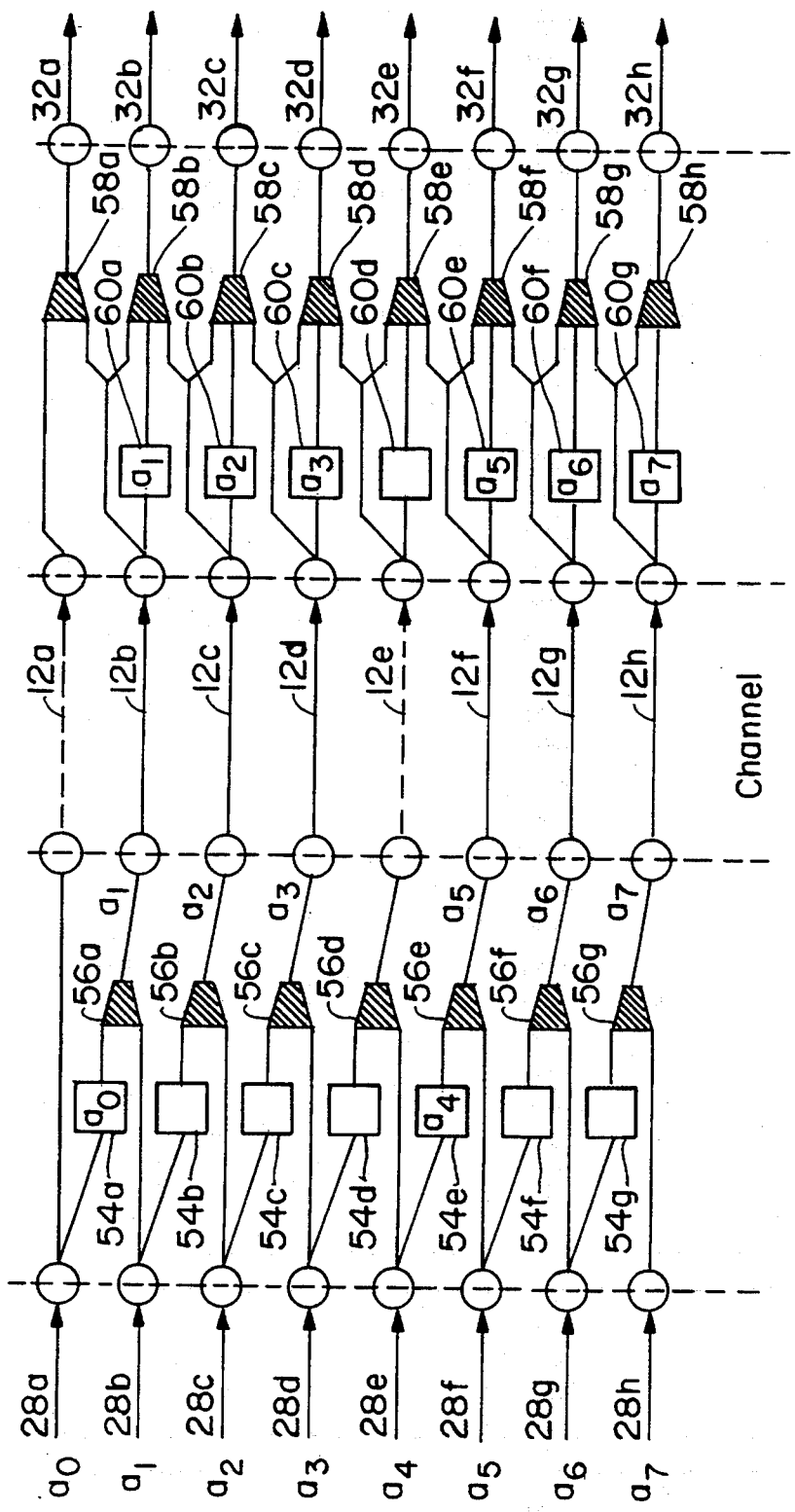
FIGS. 14A–14D illustrate the time multiplexing process of the channel width reduction switch of FIG. 12 where two links in the channel have failed.

The first transmit cycle is shown in FIG. 14A. Word A appears at the input bit lines 28a–28h. The lower ports of multiplexers 56a–56c and 56e–56g are active such that bits $a_1$–$a_3$ and $a_5$–$a_7$ pass directly to links 12b–12d and 12f–12g, respectively. They are stored in registers 60a–60c and 60e–60g, respectively, on the receive side 52 of the switch. At the same time, bit $a_0$ is stored in register 54a on the transmit side 50, and bit $a_4$ is stored in register 54e.

Figure 14B:
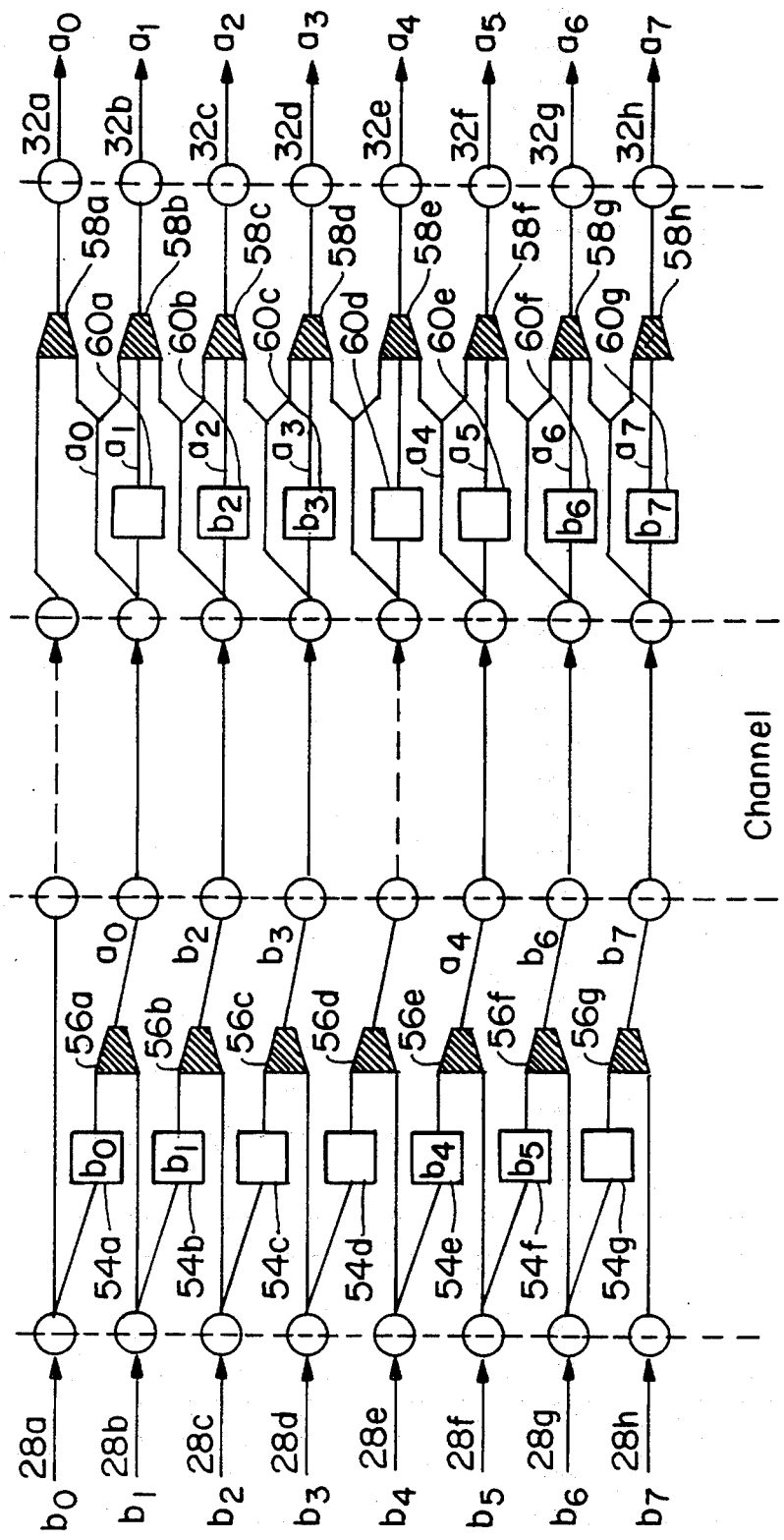

FIG. 14B shows the second transmit cycle in which data word B appears at the bit input lines 28a–28h. The upper ports of multiplexers 56a and 56e are active such that bits $a_0$ and $a_4$ are transmitted across the channel. The lower ports of multiplexers 56b, 56c, 56f and 56g are active such that bits $b_2$, $b_3$, $b_6$, and $b_7$ are also transmitted across the channel to the receive side of the switch. These bits are stored in registers 60b, 60c, 60f and 60g, respectively. At the same time, the lower ports of multiplexers 58a and 58e are active such that bits $a_0$ and $a_4$ pass to output bit lines 32a and 32e. Also, the middle ports of multiplexers 58b–58d, 58f–58h are active. Data bits $a_1$–$a_3$ and $a_5$–$a_7$ are output to output bit lines 32b–32d and 32f–32h, respectively. Thus, the completed data word A appears on the output bit lines.

Figure 14C:
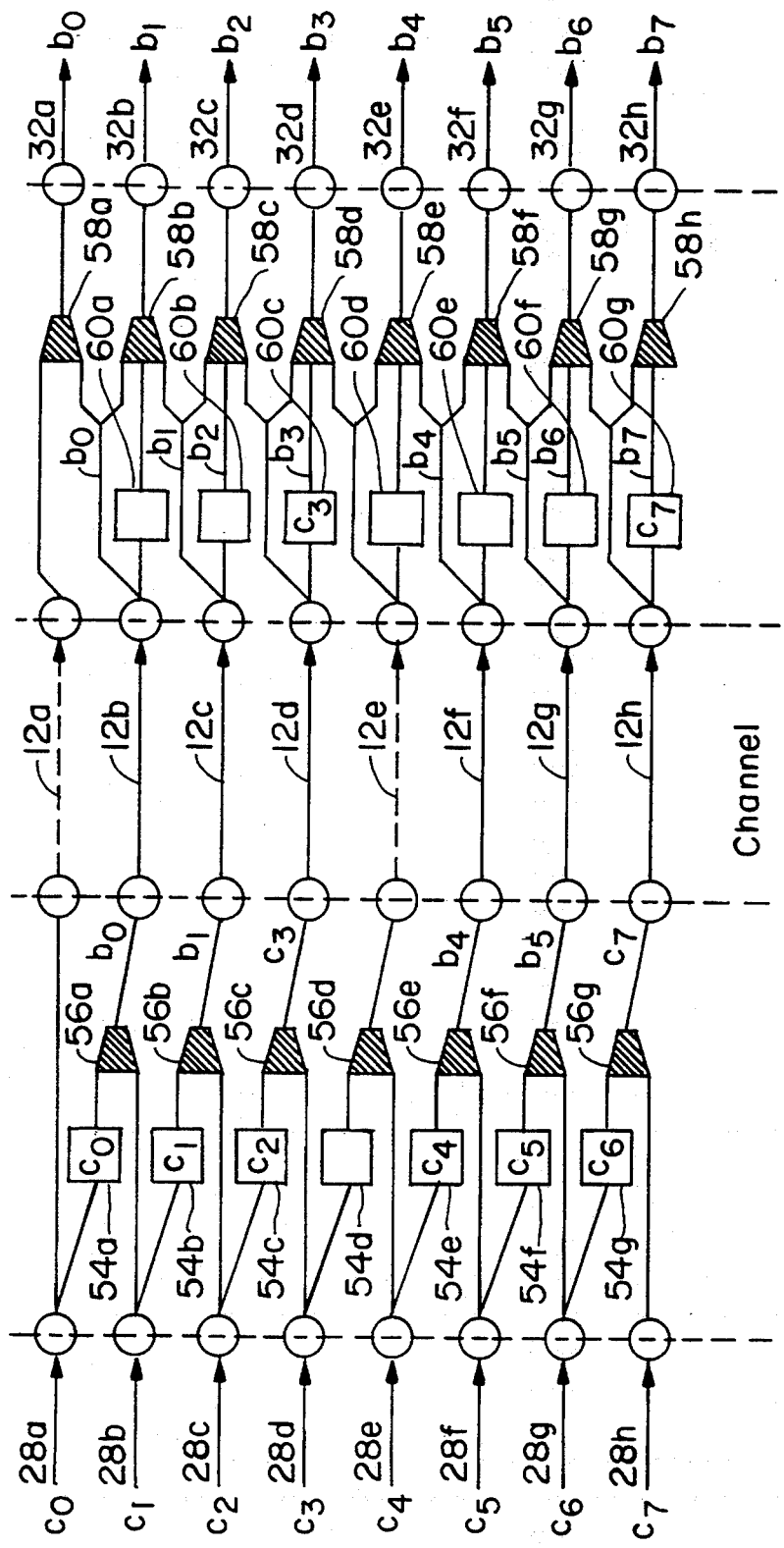

FIG. 14C shows the third cycle in which data word C appears at the input bit lines 28a–28h. Bits $c_0$–$c_2$ and $c_4$–$c_6$ are stored in registers 54a–54c and 54e–54g, respectively. Bits $c_3$ and $c_7$ are forwarded directly across the channel where they are stored in registers 60c and 60g on the receive side 52 of the switch. Bits $b_0$, $b_1$, $b_4$ and $b_5$ are also transmitted across the channel 10 where they rejoin bits $b_2$, $b_3$, $b_6$ and $b_7$. The complete data word B is output to the data output lines 32a–32h.

Figure 14D:
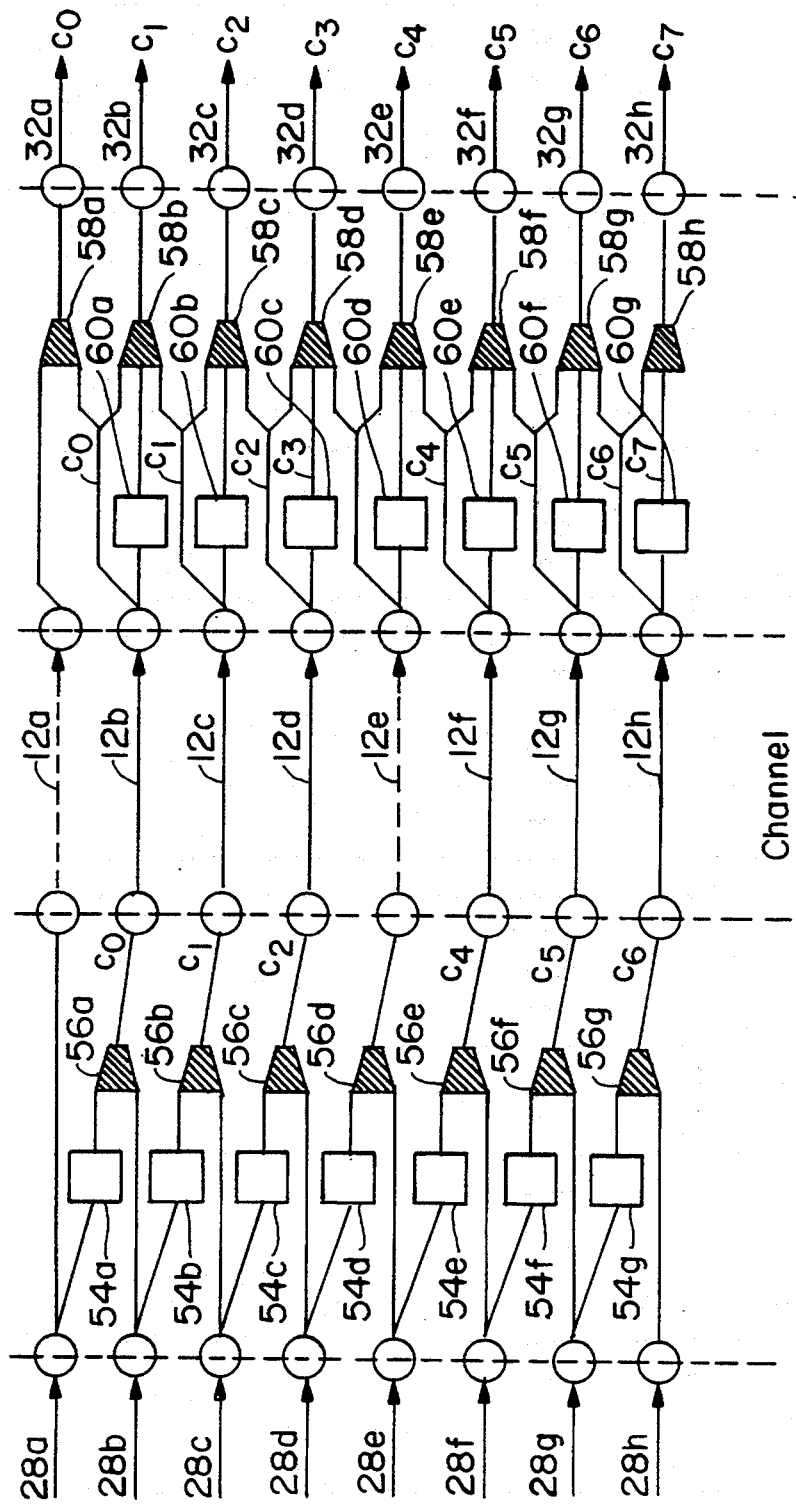

The fourth cycle is shown in FIG. 14D. Data transmission is held up for this cycle such that no data word appears on the bit input lines 28a–28h. Data bits $c_0$–$c_2$ and $c_4$–$c_6$ are enabled through multiplexers 56a–56c and 56e–56g, respectively, and are forwarded across the channel 10 where they join bits $c_3$ and $c_7$ leaving registers 60c and 60g, respectively. The completed data word C appears at the output bit lines 32a–32h.

On the fifth cycle, a fourth data word can be received at the input bit lines 28a–28h as the process begins again. Thus, three data words can be transmitted across the channel on every four cycles.

Figure 15:
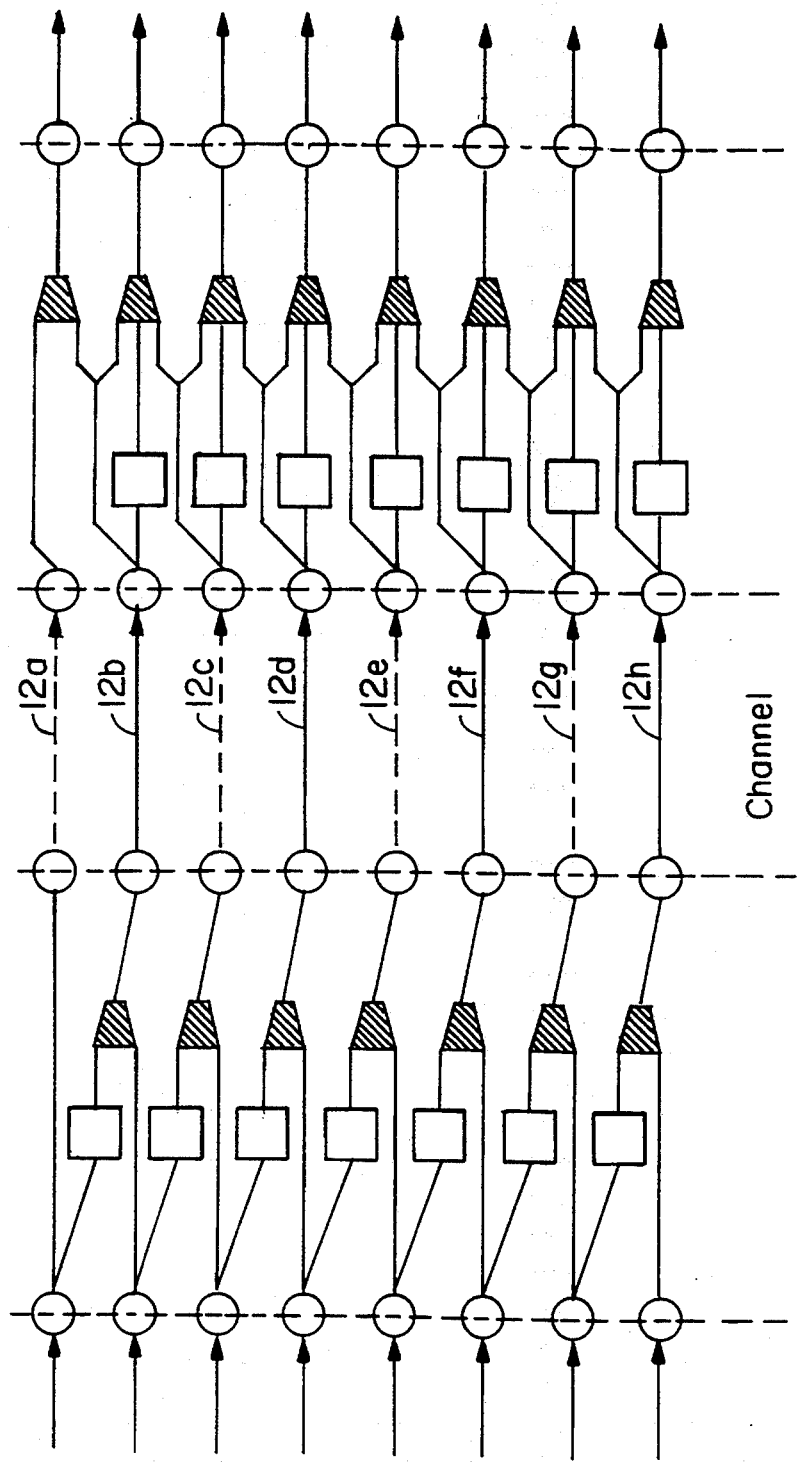
FIG. 15 is a schematic diagram of the channel width reduction switch of FIG. 12 where four failures have occurred.

FIG. 15 shows the case in which the channel width has been reduced to half of its original width by the failure of four links. The four failed links are 12a, 12c, 12e and 12g. In this mode, the channel can be regarded as four two-bit channels each of whose top link has failed. The time multiplexing function is carried out as illustrated in the two examples above. In this case, the transmission process is held up every other data word to allow transmitted data words to be completed at the receive side 52 of the switch. Thus, where the channel is reduced half its original width, words can be transmitted across it at half the full-width rate. It should be noted that with four failures in the channel, the substitution switch needed to map the failures to the positions shown would have to be at least a three-stage switch. The two-stage substitution switch as described above can only handle up to three failures. A three-stage substitution switch can handle up to $2^3 - 1 = 7$ failures.

What should also be noted from FIG. 15 is that both links 12c and 12g need not fail for this configuration to work. If only one of them fails, then the effective channel width is five-eighths of its full width. However, the timing of communication across the channel 10 will be reduced to one-half the full-width rate. This is because the time multiplexing process treats the five-eighths channel width system as four two-bit systems each of whose top link has failed. So, even though the top link of the bottom effective system, link 12g, has not failed, the timing in the time multiplexing process still reduces the rate to one-half the full-width rate.

Figure 16:
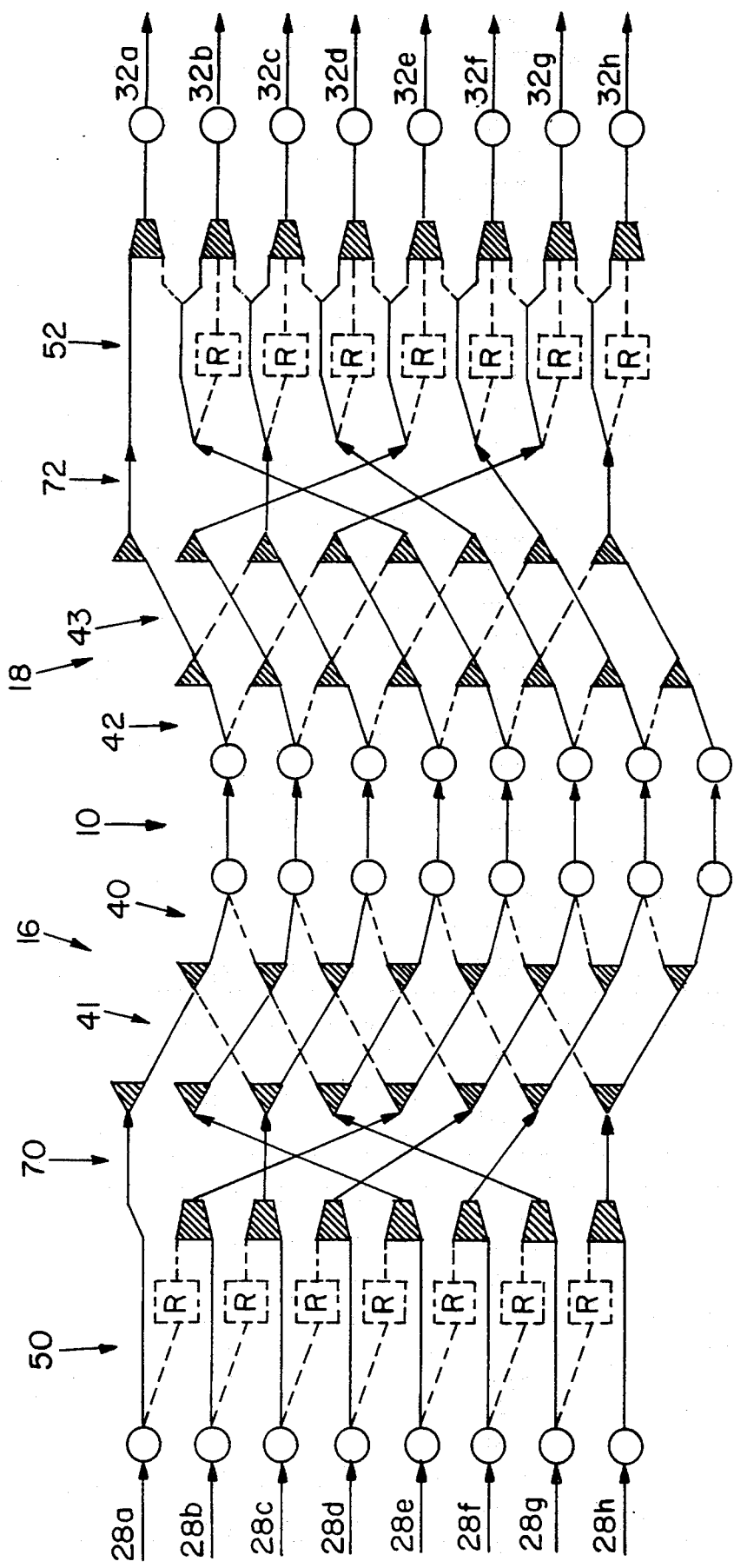
FIG. 16 is a schematic diagram depicting an embodiment of the system of the present invention using both a two-stage substitution switch and a channel width reduction switch connected to the channel.

FIG. 16 shows the system of the present invention using both a substitution switch and a channel width reduction switch to connect input bit lines 28a–28h across a channel 10 to output bit lines 32a–32h, respectively. The input bit lines 28a–28h are connected to the transmit side 50 of the channel width reduction switch which is connected across a connection network 70 to the second stage 41 on the transmit side 16 of the substitution switch. The channel 10 is connected between the first stage 40 on the transmit side 16 of the substitution switch and the first stage 42 on the receive side 18 of the substitution switch. The second stage 43 on the receive side 18 of the substitution switch is connected via a connection network 72 to the receive side 52 of the channel width reduction switch. The receive side connection network 72 is a mirror image of the transmit side connection network 70. The receive side 52 of the channel width reduction switch is connected to the output bit lines 32a–32h.

The substitution switch and the connection networks 70 and 72 act in concert to ensure that failures on the channel 10 appear in the required positions on the channel width reduction switch. As described above, the configuration of the channel width reduction switch requires that a single failure appear at the top position of the switch. A second failure should appear in the fifth position, a third failure should appear in the third position, and a fourth failure should appear in the seventh position. Channel link failures are mapped toward the top position of the substitution switch as previously described. The connection networks 70 and 72 then connect the substitution switch positions to the appropriate channel width reduction switch positions.

FIG. 16 shows the state of the system when no link failures have occurred, that is, when the channel is operating at its full channel width. The input bit lines 28a–28h are connected across the channel by the switches to the output bit lines 32a–32h respectively. In FIG. 16, the storage registers and the lines connected to them are shown as dotted lines because when there are no failures on the channel, the time multiplexing function of the channel width reduction switch is not implemented. The input bits are transmitted directly through the channel width reduction switch, the substitution switch and the channel to the output bit lines.

Figure 17A:
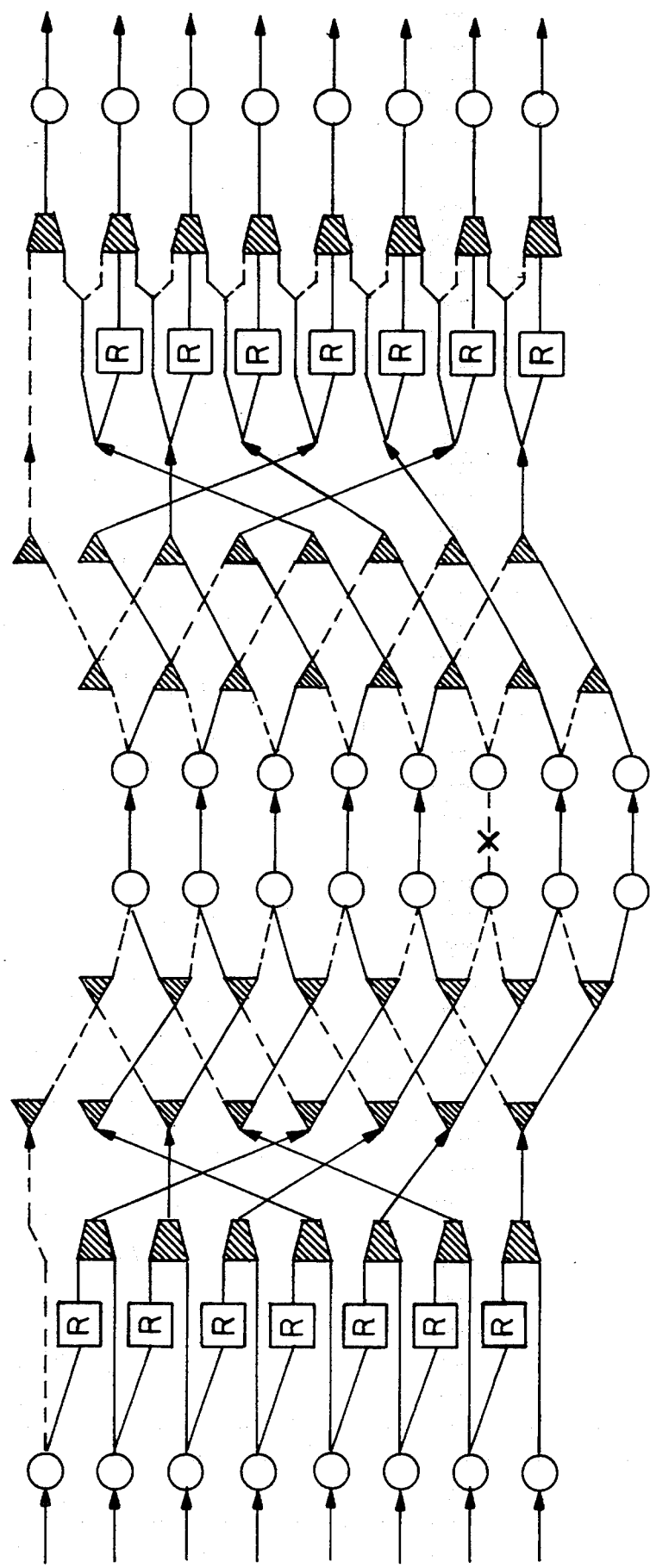
FIG. 17A is a schematic diagram of the system of FIG. 6 in which a single link failure has occurred.

FIGS. 17A–17D illustrate the operation of the system when one, two, three and four failures, respectively have occurred on the channel. FIG. 17A shows the seven-eighths channel width case. The third link from the bottom has failed. In accordance with the foregoing description, the substitution switch has mapped the failure to the top position of the switch. Consequently, the top position in the channel width reduction switch is inoperative, and the channel width reduction switch operates as described above to time multiplex data bits across the channel 10. Seven data words will be transmitted across the channel on every eight transmit cycles. Thus, the channel operates at seven-eighths its normal rate.

Figure 17B:
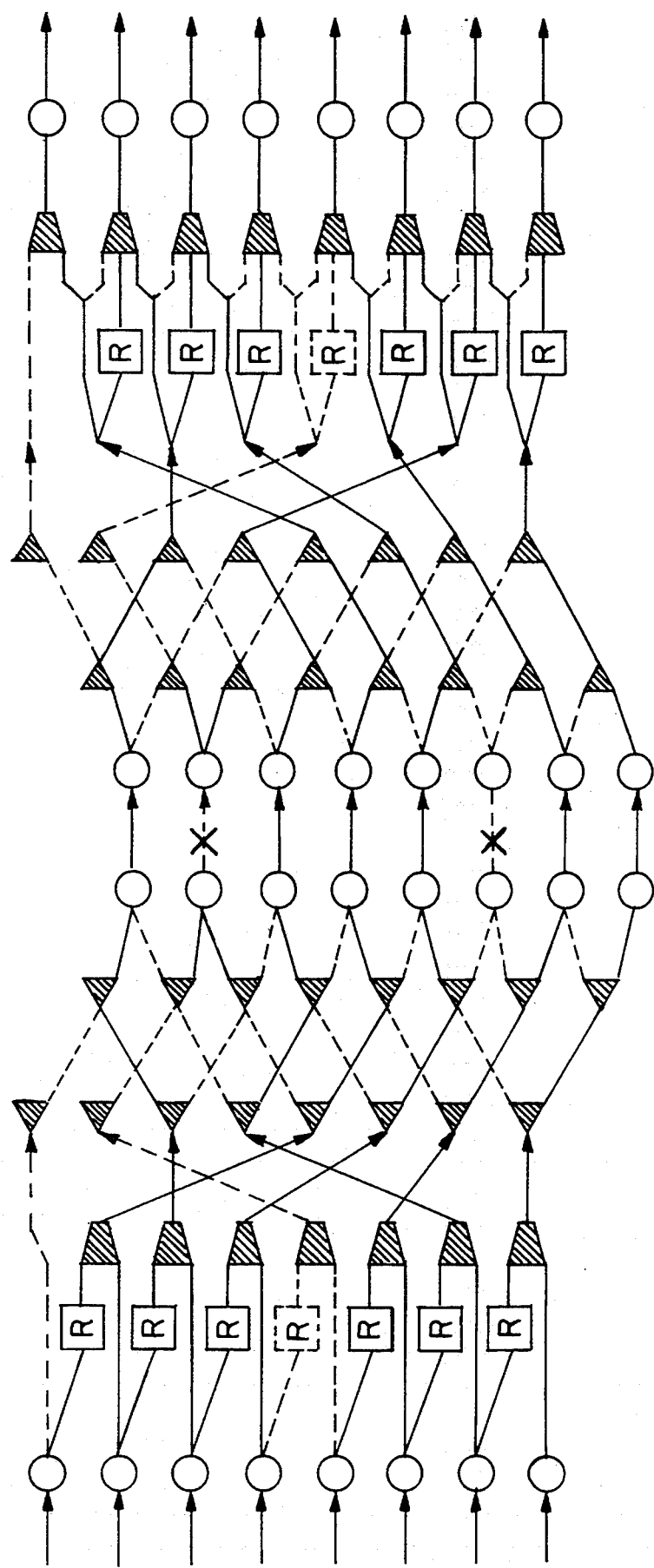
FIG. 17B is a schematic diagram of the system of FIG. 16 in which two link failures have occurred.

FIG. 17B shows the three-quarters channel width case in which two links have failed. The two failures have been mapped to the top two positions of the substitution switch. The connection networks 70 and 72 connect the top failure to the top position in the channel width reduction switch and the second failure to the fifth position in the channel width reduction switch. Consequently, the channel width reduction switch operates as previously described for two failures with the failures mapped to the appropriate positions.

Figure 17C:
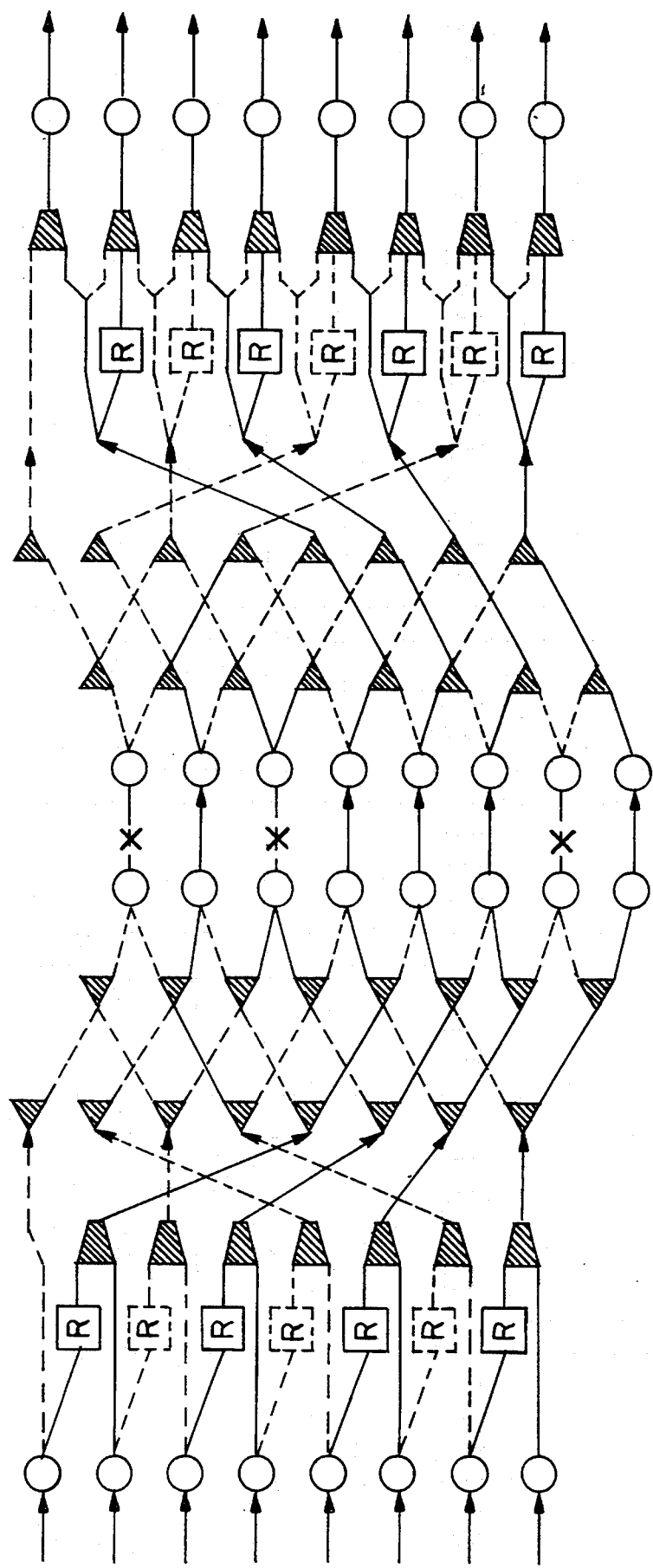
FIG. 17C is a schematic diagram of the system of FIG. 16 in which three link failures have occurred.

FIG. 17C shows the five-eighths channel width case in which three failures have occurred. The three failures are mapped to the top three positions of the substitution switch, and the connection networks 70 and 72 connect the failures to the first, fifth and third positions in the channel width reduction switch. As noted above, this failure configuration operates at five-eighths channel width but operates at only one-half its full width rate.

Figure 17D:
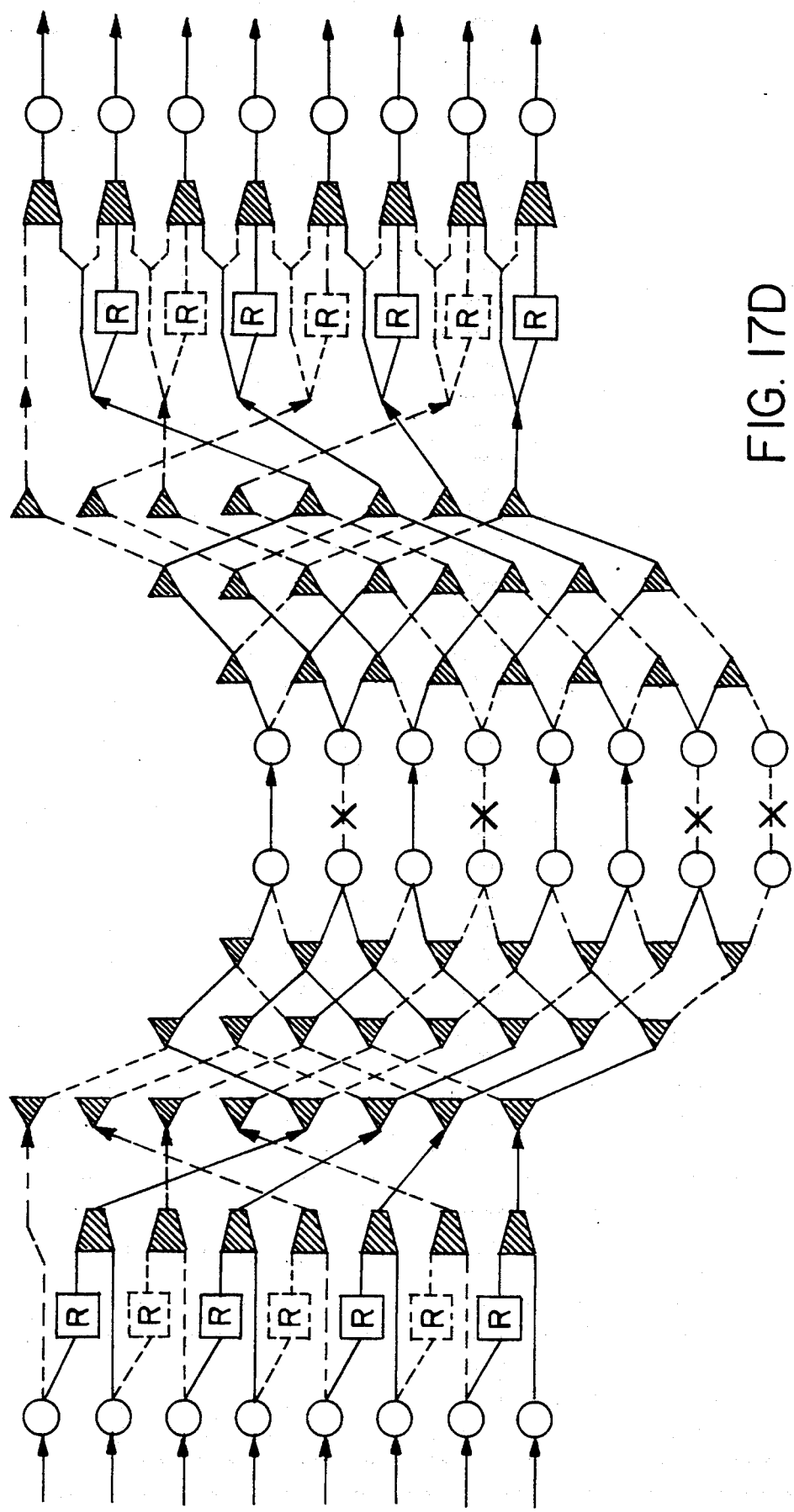
FIG. 17D is a schematic diagram of an embodiment of the system of the present invention using a three-stage substitution switch and a channel width reduction switch in which four link failures have occurred.

FIG. 17D shows the actual one-half channel width case in which four failures have occurred on the channel As mentioned above, a three-stage substitution switch is used in this case to accommodate the four failures. The four failures are mapped to the top four positions of the substitution switch, and the connection networks 70 and 72 map the four failures to the first, third, fifth and seventh positions of the channel width reduction switch. This is the true one-half bandwidth case in which there are effectively four two-bit networks each of whose top link has failed. The time multiplexing function results in the transmission rate of the system being reduced to one-half its full-width rate.

It should be noted that the combination of the substitution switch and channel width reduction switch is described in connection with a system which has no spare links in the channel. However, this need not be the case. The channel may have spare links. In that case, the substitution switch would operate as previously described to bypass failed links with spare links. When spare links are exhausted, subsequent failures are mapped to desired failure locations as previously described to allow the channel width reduction switch to carry out the time multiplexing function.

Figure 18:
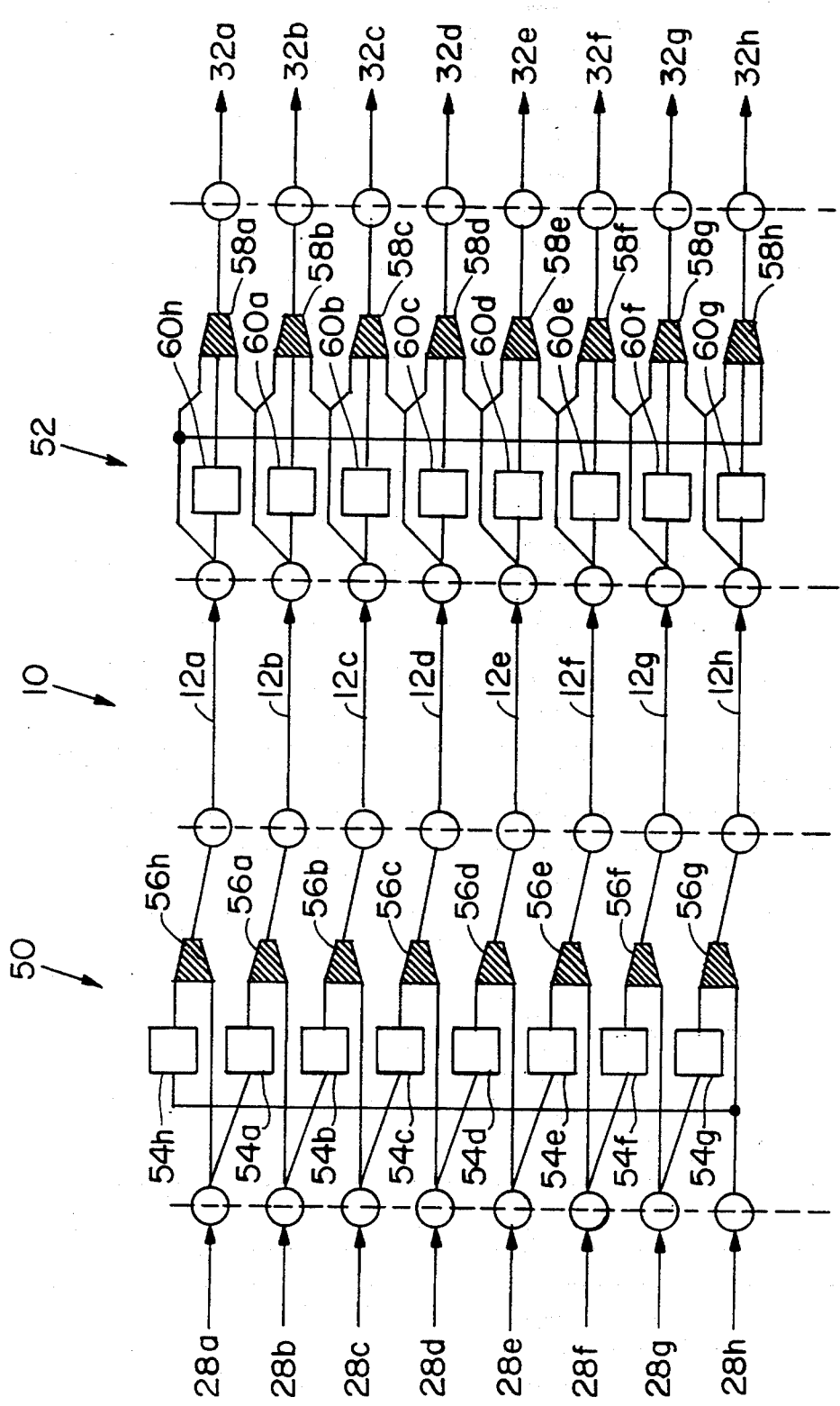
FIG. 18 is a schematic diagram of a communication system using a channel width reduction switch with a wrap-around feature.

Also, for handling a single failure, the substitution switch can be eliminated from the system completely. Referring to FIG. 18, an additional register 54h has been added to the transmit side 50 of the channel width reduction switch of FIG. 12. The input of the register 54h is taken from input bit line 28h, and its output is connected to an input of an additional multiplexer 56h. The second input to multiplexer 56h is taken from input bit line 28a. On the receive side 52 of the switch, an additional register 60h is connected between channel link 12a and an input to multiplexer 58a. This modification effectively adds a wrap-around feature to the channel width reduction switch to eliminate the requirement that a single failure appear at the top of the switch. The time multiplexing process described above is implemented with the failed link in the modified system replacing the top link in the system of FIG. 12. Thus, a substitution switch is not needed to map the failure to the top position if recovery from only a single failure is to be provided.

Further details of an initial implementation of the invention can be found in the Massachusetts Institute of Technology Ph.D. Thesis of James J. Olsen, 1993, which is incorporated herein by reference.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. A method of continuing use of a multiple link communication channel as links of the channel become inoperative comprising:
   reconfiguring the communication channel to use less than all communication links of the channel; and
   transmitting the data over operating links by storing bits of a data word being transmitted while directly transmitting remaining bits of the data word such that data words are transmitted across the channel over the operating links in time multiplexed fashion.

2. A method as claimed in claim 1 wherein the communication channel is reconfigured to bypass an inoperative link with a spare link at the pre-determined position.

3. The method of claim 1 wherein the transmitting step comprises:
   in successive cycles:
      directly transmitting a number of directly transmitted bits of a word over the operating links and storing a number of stored bits of the word for transmission in a succeeding cycle; and
      in the succeeding cycle, transmitting the previously stored bits with a number of directly transmitted bits of a next succeeding word, the number of directly transmitted bits being less than the number of directly transmitted bits in the prior cycle, and storing a number of stored bits of the next succeeding word for transmission in a later succeeding cycle, the number of stored bits being greater than the number of stored bits in the prior cycle; and
   after successive cycles, suspending acceptance of a word for a cycle while transmitting all stored bits.

4. A method of communicating a number of parallel bits of data words over a lesser number of communication links of a communication channel comprising:
   in successive cycles:
      directly transmitting a number of directly transmitted bits of a word over the communication links and storing a number of stored bits of the word for transmission in a succeeding cycle; and
      in the succeeding cycle, transmitting the previously stored bits with a number of directly transmitted bits of a next succeeding word, the number of directly transmitted bits being less than the number of directly transmitted bits in the prior cycle, and storing a number of stored bits of the next succeeding word for transmission in a later succeeding cycle, the number of stored bits being greater than the number of stored bits in the prior cycle; and
   after successive cycles, suspending acceptance of a word for a cycle while transmitting all stored bits.

5. A method as claimed in claim 4 further comprising receiving at a receiver the number of parallel bits of a data word, said receiving comprising holding during a cycle the directly transmitted bits of the data word to bring, during a next succeeding cycle, the directly transmitted bits of the data word into phase with the stored bits of the data word.

6. A method as claimed in claim 4 further comprising the step of reconfiguring the channel by switches which bypass inoperative communication links.

7. A method of communicating over a plurality of links of a multiple link communication channel in which individual bits of a transmitted word are transmitted in parallel over respective communication links comprising:
   providing spare links in a communication channel;
   switching a spare link into the channel to bypass a failed link; and
   transmitting data over operating links by storing bits of a data word being transmitted while directly transmitting remaining bits of the data word such that data words are transmitted across the channel over the operating links in time multiplexed fashion.

8. A communication system for continuing use of a multiple link communication channel as links of the channel become inoperative comprising:
   a transmitting array of switches and a receiving array of switches, the arrays of switches reconfiguring the communication channel to use less than all the links in the channel by switching an inoperative link toward a pre-determined position; and
   a bit storage device for storing bits of a data word while remaining bits of the data word are directly transmitted across the channel, such that bits of a data word are transmitted over operating links in a time multiplexed fashion.

9. A communication system as claimed in claim 8 wherein the communication channel is reconfigured to bypass an inoperative link with a spare link at the predetermined position.

10. A communication system as claimed in claim 8 wherein, to transmit data word in a time multiplexed fashion, the communication system:
    in successive cycles:
       directly transmits a number of directly transmitted bits of a word over the operating links and stores a number of stored bits of the word for transmission in a succeeding cycle; and
       in the succeeding cycle, transmits the previously stored bits with a number of directly transmitted bits of a next succeeding word, the number of directly transmitted bits being less than the number of directly transmitted bits in the prior cycle, and stores a number of stored bits of the next succeeding word for transmission in a later succeeding cycle, the number of stored bits being greater than the number of stored bits in the prior cycle; and
    after successive cycles, suspends acceptance of a word for a cycle while transmitting all stored bits.

11. A communication system for communicating a number of parallel bits of data words over a lesser number of communication links of a communication channel comprising:
    a transmitting subsystem for transmitting bits across the channel;
    a receiving subsystem for receiving data bits from the channel; and
    a transmitting subsystem storage device for storing bits of a data word; the communication system in successive cycles:

directly transmitting with the transmitting subsystem a number of directly transmitted bits of a word over the communication links and storing with the storage device a number of stored bits of the word for transmission in a succeeding cycle; and in the succeeding cycle, transmitting with the transmitting subsystem the previously stored bits with a number of directly transmitted bit of a next succeeding word, the number of directly transmitted bits being less than the number of directly transmitted bits in the prior cycle, and storing with the storage device a number of stored bits of the next succeeding word for transmission in a later succeeding cycle, the number of stored bits being greater than the number of stored bits in the prior cycle; and after successive cycles, suspending acceptance of a word for a cycle while transmitting all stored bits.

12. A communication system as claimed in claim 11 further comprising a receiving subsystem storage device for storing directly transmitted bits of a preceding cycle for one cycle to bring the directly transmitted bits of a succeeding cycle into phase with the directly transmitted bits of the preceding cycle stored in the receiving subsystem storage device.

13. A communication system as claimed in claim 11 further comprising a plurality of switches for reconfiguring the communication channel to bypass inoperative communication links.

14. A communication system for communicating over a plurality of links of a multiple link communication channel in which individual bits of a transmitted word are transmitted in parallel over respective communication links comprising:

at least one spare link in the communication channel;

a plurality of switches for reconfiguring the channel to bypass a failed link by switching communication from the failed link to the spare link;

a transmitting subsystem for transmitting data over the communication channel; and a bit storage device for storing bits of a data word being transmitted while remaining bits of the data word are directly transmitted by the transmitting subsystem, such that data words are transmitted across the communication channel in time multiplexed fashion.

15. A communication system for communicating parallel bits of a data word from input bit lines to output bit lines comprising:

plural communication links;

a transmitting array of switches for mapping the input bit lines to the communication links, the switches being operable to change a mapping between the input bit lines and the communication links; and a receiving array of switches for mapping the output bit lines to the communication links, the switches being operable to change a mapping between the output bit lines and the communication links; wherein, upon failure of a communication link, the switches of the transmitting and receiving arrays are operated to change the mapping between the input bit lines and the communication links and the mapping between the output bit lines and the communication links such that a predetermined input bit line and a predetermined output bit line, not necessarily the input bit line and output bit line previously mapped to the failed communication link, are mapped to a predetermined link failure position.

16. A communication system as claimed in claim 15 wherein each array of switches comprises plural stages of switches which operate in series to extend the degree to which the mappings can be changed.

17. A communication system as claimed in claim 15 wherein the communication links include spare links and changing the mappings replaces links with spare links.

18. A communication system as claimed in claim 15 further comprising a time multiplexer for time multiplexing data intended for a failed link with data over an operating link.

19. A communication system as claimed in claim 15 wherein a spare link is located at the predetermined failure position.

20. A communication system as claimed in claim 15 wherein the transmitting array of switches comprises multiplexer circuits.

21. A communication system as claimed in claim 15 wherein the transmitting array of switches comprises demultiplexer circuits.

22. A communication system as claimed in claim 15 wherein the receiving array of switches comprises multiplexer circuits.

23. A communication system as claimed in claim 15 wherein the receiving array of switches comprises demultiplexer circuits.

24. A communication system for communicating parallel bits of a data word from input bit lines to output bit lines comprising:

plural communication links;

a transmitting array of switches for connecting the communication links to the input bit lines, the switches allowing for remapping of interconnections between input bit lines and communication links, each link being connectable to each of at least two input bit lines;

a receiving array of switches for connecting the communication links to output bit lines, the switches allowing for remapping of interconnections between the communication links and the output bit lines, each link being connectable to each of at least two output bit lines; and a time multiplexer for time multiplexing data intended for a failed link with data over an operating link.

25. A method of continuing use of a multiple link communication channel as links of the channel become inoperative comprising:

reconfiguring the communication channel to use less than all communication links of the channel by switching an inoperative link toward a pre-determined position within the communication channel; and transmitting the data over operating links in time multiplexed fashion, said transmitting comprising:

in successive cycles:

directly transmitting a number of directly transmitted bits of a word over the operating links and storing a number of stored bits of the word for transmission in a succeeding cycle, and in the succeeding cycle, transmitting the previously stored bits with a number of directly transmitted bits of a next succeeding word, the number of directly transmitted bits being less than the number of directly transmitted bits in the prior cycle, and storing a number of stored bits of the next succeeding word for transmission in a later succeeding cycle, the number of stored bits being greater than the number of stored bits in the prior cycle; and after successive cycles, suspending acceptance of a word for a cycle while transmitting all stored bits.

* * * * *

UNITED STATES PATENT AND TRADEMARK OFFICE
CERTIFICATE OF CORRECTION

PATENT NO.   :   5,440,538
DATED        :   August 8, 1995
INVENTOR(S)  :   James J. Olsen It is certified that error appears in the above-identified patent and that said Letters Patent is hereby corrected as shown below:

Column 1, line 4, insert the following:

-- This invention was made with government support under Contract Number F19628-90-C-0002 awarded by the Air Force. The government has certain rights in the invention.--

Signed and Sealed this

Twenty-eighth Day of May, 1996

Attest:

BRUCE LEHMAN

*Attesting Officer*    *Commissioner of Patents and Trademarks*